(12) United States Patent
Densel et al.

(10) Patent No.: US 8,887,762 B2
(45) Date of Patent: Nov. 18, 2014

(54) QUICK CONNECT COUPLING WITH NESTED BALL VALVES

(75) Inventors: David Scott Densel, Waterville, OH (US); Gregory Alan Haunhorst, Monclova, OH (US)

(73) Assignee: Eaton Corporation, Cleveland, OH (US)

( * ) Notice: Subject to any disclaimer, the term of this patent is extended or adjusted under 35 U.S.C. 154(b) by 154 days.

(21) Appl. No.: 13/536,553

(22) Filed: Jun. 28, 2012

(65) Prior Publication Data

US 2013/0032234 A1 Feb. 7, 2013

Related U.S. Application Data

(60) Provisional application No. 61/503,988, filed on Jul. 1, 2011.

(51) Int. Cl.
*F16L 37/36* (2006.01)
*F16L 37/373* (2006.01)

(52) U.S. Cl.
CPC ............... *F16L 37/36* (2013.01); *F16L 37/373* (2013.01)
USPC .................................. 137/614.06; 251/149.9

(58) Field of Classification Search
USPC ............... 137/15.22, 614.01, 614.11, 614.06, 137/614.04, 630.15, 637.1, 864–866; 251/149.1, 149.9, 100–116, 95, 96, 251/248, 250.5; 285/86, 376, 361, 396, 402
See application file for complete search history.

(56) References Cited

U.S. PATENT DOCUMENTS

| | | | |
|---|---|---|---|
| 2,660,457 A | 11/1953 | Mallon | |
| 2,872,216 A * | 2/1959 | Kaiser | 137/637.05 |
| 2,948,553 A * | 8/1960 | Gill et al. | 137/614.02 |
| 3,159,180 A * | 12/1964 | Courtot et al. | 137/614.06 |
| 4,438,779 A * | 3/1984 | Allread | 137/614.06 |
| 4,622,997 A | 11/1986 | Paddington | |
| 4,687,016 A | 8/1987 | Takahashi | |
| 5,332,001 A * | 7/1994 | Brown | 137/614.06 |
| 5,402,825 A * | 4/1995 | McCracken | 137/614.06 |
| 5,488,972 A | 2/1996 | McCracken et al. | |
| 5,505,428 A * | 4/1996 | De Moss et al. | 251/149.9 |
| 5,595,217 A * | 1/1997 | Gillen et al. | 137/614.06 |
| 6,056,011 A | 5/2000 | Bormioli | |
| 6,945,273 B2 | 9/2005 | Reid | |
| 7,021,669 B1 | 4/2006 | Lindermeir et al. | |
| 7,967,026 B2 | 6/2011 | Chang et al. | |
| 8,082,947 B2 | 12/2011 | Chang et al. | |
| 8,132,781 B2 * | 3/2012 | Haunhorst | 251/149.9 |
| 8,662,108 B2 * | 3/2014 | Haunhorst | 137/614.01 |

* cited by examiner

*Primary Examiner* — John K Fristoe, Jr.
*Assistant Examiner* — Craig J Price
(74) *Attorney, Agent, or Firm* — Merchant & Gould P.C.

(57) ABSTRACT

A quick connect coupling includes female and male assemblies. The female and male assemblies include first and second valves, respectively, operable between open and closed positions. The male assembly connects to the female assembly by axial movement and relative rotation, wherein the male assembly disconnects from the female assembly by relative rotation and axial separation, wherein relative rotation of the assemblies moves the second valve between the open and closed positions. Moving the second valve from the closed to the open position allows the first valve to be movable from the closed position to the open position and moving the first valve from the closed to the open position limits relative rotation between the assemblies and prevents disconnection. Disconnection can only occur when the first valve has been moved to the closed position. Disconnection moves the second valve from the open to the closed position.

10 Claims, 24 Drawing Sheets

US 8,887,762 B2

QUICK CONNECT COUPLING WITH NESTED BALL VALVES

CROSS REFERENCE TO RELATED APPLICATIONS

This application claims the benefit of U.S. Provisional patent application Ser. No. 61/503,988, filed Jul. 1, 2011, which application is hereby incorporated by reference in its entirety.

FIELD

The present disclosure generally relates to quick connect couplings to establish fluid flow between two conduits. More specifically, the present disclosure relates to a quick connect coupling including nested ball valves.

BACKGROUND

Most quick connect couplings have valve components that remain in the flow path after the coupling is connected and valves opened. The fluid must flow around these restrictions resulting in turbulent flow that increases pressure drop and fluid temperature. Typically, hydraulic systems are over designed to tolerate this energy loss and heat generation. However, some systems, such as liquid electronics cooling systems, strive to minimize pump pressures, heat generation and energy consumption. Therefore, couplings with maximum flow and with an unobstructed flow path are desired.

Another key requirement of a quick connect coupling for an electronics cooling system is minimum spillage of the cooling fluid upon disconnection. This is desired to avoid shorting or other damage to electronic components.

Couplings with rotating ball valves, such as the coupling available from Aeroquip under the Model No. FD83, provide a straight through, unobstructed flow path for maximum flow. The coupling available under the Model No. FD83 is described in U.S. Pat. No. 4,438,779, the entire disclosure of which is incorporated herein by reference. The coupling from Aeroquip under the Model Name Epsilon is another full flow, ball valve, coupling that utilizes concave/convex balls to achieve nearly zero spillage. The coupling available under the Model Name Epsilon is described in U.S. Pat. No. 5,488,972, the entire disclosure of which is also incorporated herein by reference. Although these coupling designs have some of the desired features, they have certain disadvantages such as excessive envelope size due to the ¼ turn lug and groove latching mechanism, dual handles requiring multiple steps to actuate valves, excessive cost, and being only designed in large sizes.

What is needed in the art is a quick connect coupling with an unobstructed flow path to minimize pressure drop and thereby improve system (and/or energy) efficiency and also to minimize fluid spillage upon disconnection and to provide simple, safe operation.

SUMMARY

The present disclosure relates generally to quick connect couplings to establish fluid flow between two conduits. More specifically, the present disclosure relates to a quick connect coupling including a concave/convex nested ball valve arrangement, wherein the quick connect coupling is configured to provide a correct sequencing of the opening and closing of the nested ball valves for proper and safe operation.

According to one example aspect, the quick connect coupling includes a gear arrangement/mechanism to sequence valve actuation.

According to another example aspect, the quick connect coupling includes a male assembly and a female assembly, wherein the gear arrangement automatically opens a first of the nested ball valves when the male and female assemblies are connected and rotated with respect to each other.

According to yet another example aspect, the quick connect coupling includes a female assembly and a male assembly configured to be coupled to the female assembly. The female assembly includes a first valve configured to be operable between an open position and a closed position. The male assembly includes a second valve configured to be operable between an open position and a closed position. The male and female assemblies are configured such that the male assembly is connectable to the female assembly by moving the two assemblies axially toward each other and rotating the two assemblies relative to each other, wherein the male assembly is disconnected from the female assembly by rotating the two assemblies relative to each other and axially separating the two assemblies from each other, wherein relative rotation of the two assemblies moves the second valve between the open position and the closed position. Movement of the second valve from the closed position to the open position allows the first valve of the female assembly to be movable from the closed position to the open position and movement of the first valve from the closed position to the open position limits relative rotation between the two assemblies and prevents disconnection of the two assemblies such that the two assemblies can only be disconnected when the first valve has been moved to the closed position and wherein disconnection of the two assemblies moves the second valve from the open position to the closed position.

BRIEF DESCRIPTION OF THE DRAWINGS

The accompanying drawings, which are incorporated in and constitute a part of the description, illustrate several aspects of the inventive features and together with the detailed description, serve to explain the principles of the disclosure. A brief description of the drawings is as follows.

DETAILED DESCRIPTION

Reference will now be made in detail to exemplary aspects of the present invention which are illustrated in the accompanying drawings. Wherever possible, the same reference numbers will be used throughout the drawings to refer to the same or similar parts.

FIGS. 1-24 illustrate a quick connect coupling 10 having features that are examples of inventive aspects in accordance with the present disclosure. The quick connect coupling 10 utilizes a concave/convex ball valve design known in the art as its basis to provide fluid flow and limit the amount of unwanted spillage that might occur during disconnection.

Figure 1:
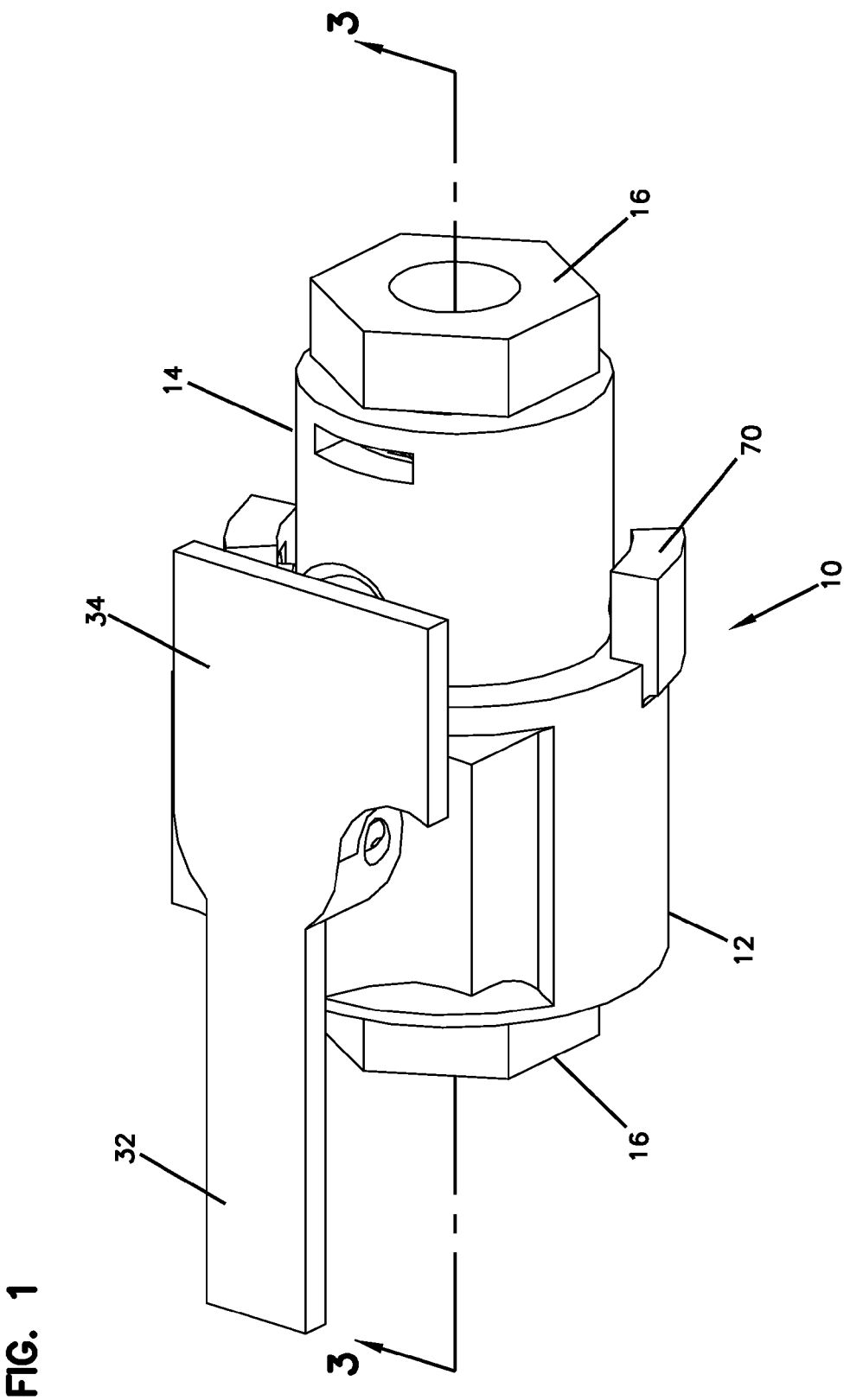
FIG. 1 is a perspective view of a quick connect coupling having features that are examples of inventive aspects in accordance with the present disclosure.
Figure 2:
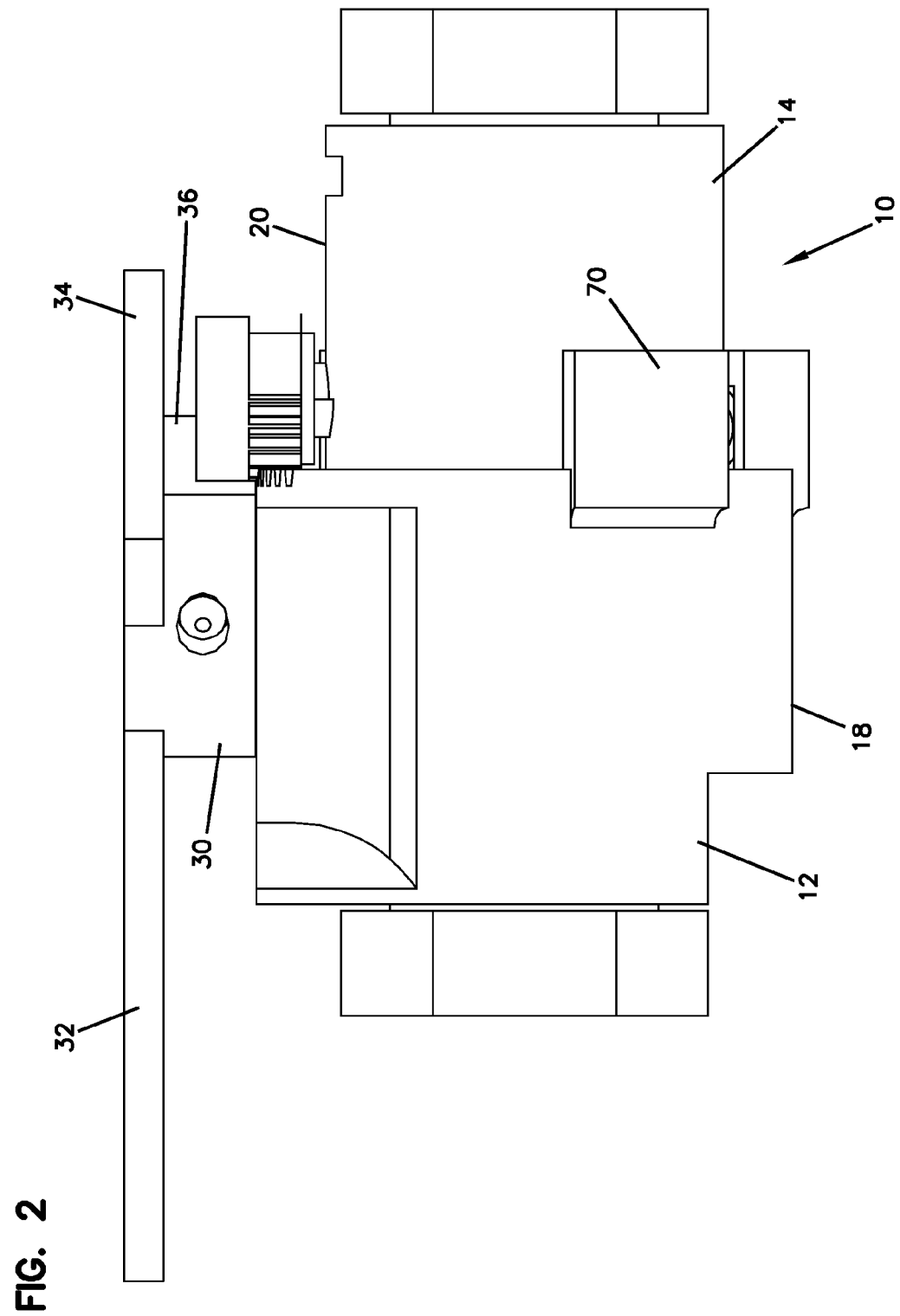
FIG. 2 is a side view of the quick connect coupling of FIG. 1.
Figure 3:
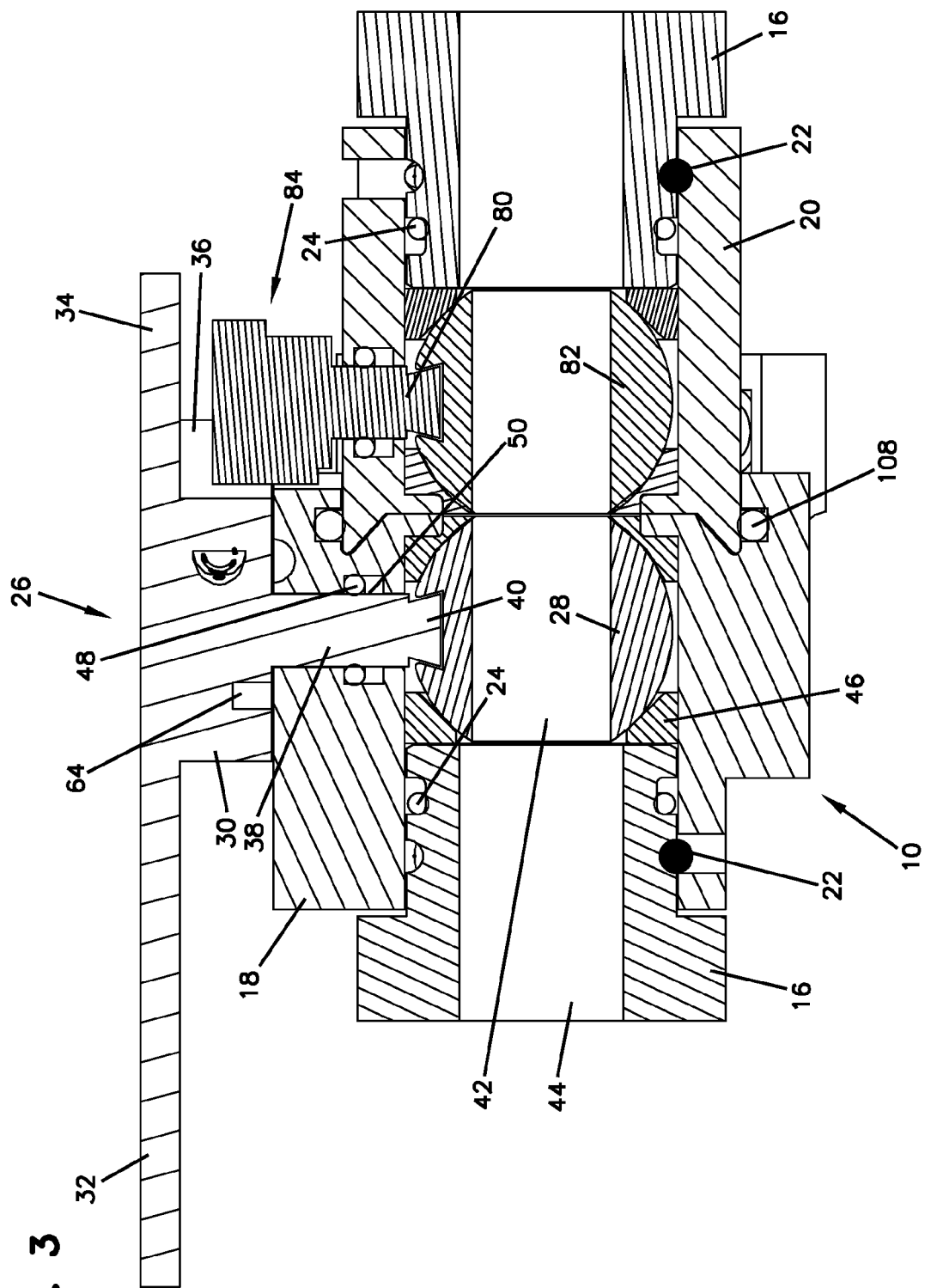
FIG. 3 is a cross-sectional view taken along line 3-3 of FIG. 1.

Referring to FIGS. 1-3, the quick connect coupling 10 includes a female assembly 12 and a male assembly 14 that is configured to be coupled to the female assembly 12 to establish fluid flow between two conduits. Each of the female and male assemblies 12, 14 may be connected to their respective conduits via swivel adapters 16. Each of the swivel adapters 16 may be attached to a female assembly main housing 18 and a male assembly main housing 20, respectively, through a lock wire 22. O-ring seals 24 may be provided between the swivel adapters 16 and each of the female and male main housings 18, 20, respectively.

Referring to FIGS. 4-7, the female assembly 12 is shown in isolation. In addition to the main housing 18 and a swivel adapter 16, the female assembly 12 includes a handle assembly 26 that is configured to be rotated for opening and closing a first ball valve 28 within the main housing 18. The handle assembly 26 defines a generally circular main body 30. An elongate handle portion 32 extends from the main body 30 and is configured for use by an operator in providing the torque required to open the ball valve 28 within the main housing 18. A top plate 34 extends from the main body 30 in a direction opposite the handle portion 32. Another extension 36 located under the top plate 34 extends from the generally circular body 30 in the opposite direction from the handle 32 as shown in the cross-sectional view of FIG. 6.

The handle assembly 26 includes a shaft 38 extending from the main body 30 into the main housing 18 of the female assembly 12. The shaft 38 defines a notched end portion 40 that defines a dovetail type interlock with the ball valve 28. By rotating the handle 32 about 90°, the throughhole 42 of the ball valve 28 can be aligned with the throughhole 44 defined by the swivel adapter 16 to establish fluid flow.

The ball valve 28 may be sealed within the female assembly main housing 18 with a seal 46 (e.g., PTFE). An O-ring 48 is also provided to form a seal between the rotation shaft 38 of the handle assembly 26 and the bore 50 defined in the female assembly main housing 18 that receives the shaft 38.

Figure 7:
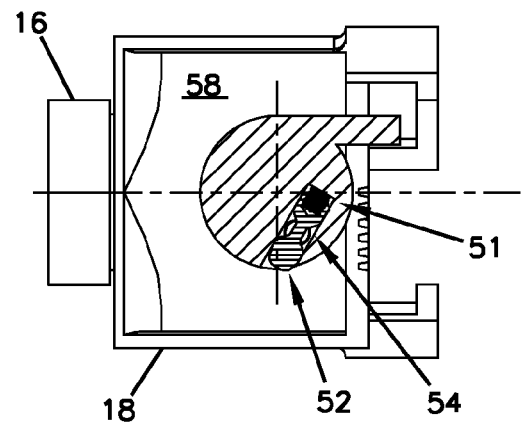
FIG. 7 is a cross-sectional view taken along line 7-7 of FIG. 6.
Figure 8:
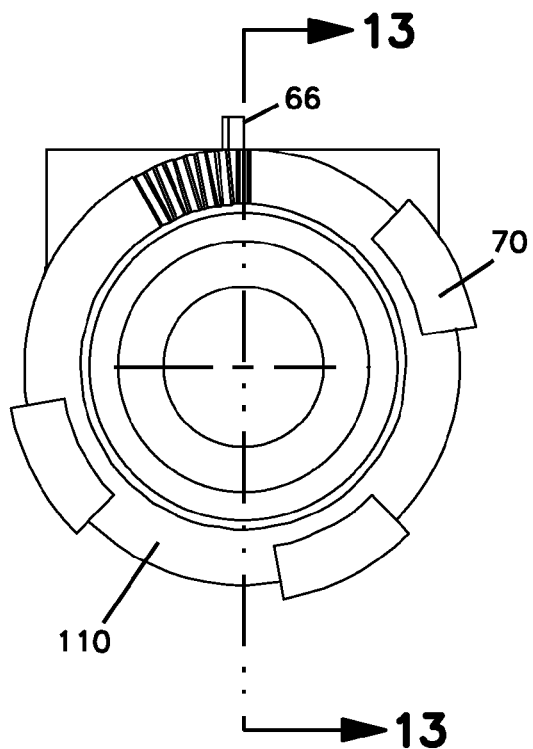
FIG. 8 is a front view of the main housing of the female assembly of FIGS. 4-7.
Figure 9:
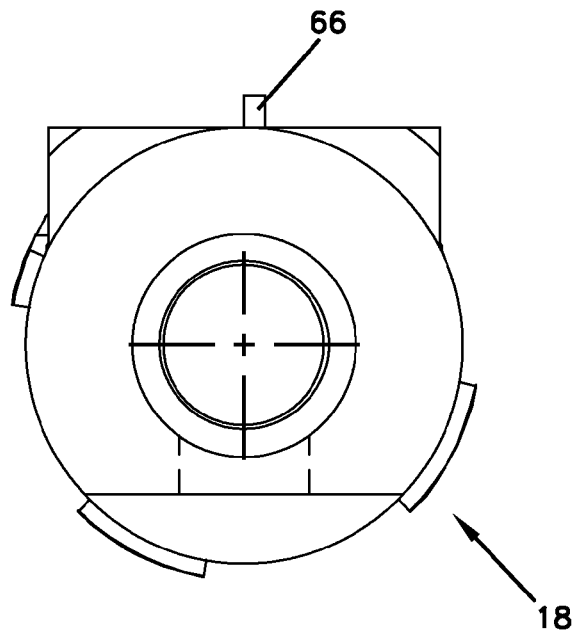
FIG. 9 is a rear view of the female assembly main housing of FIG. 8.
Figure 10:
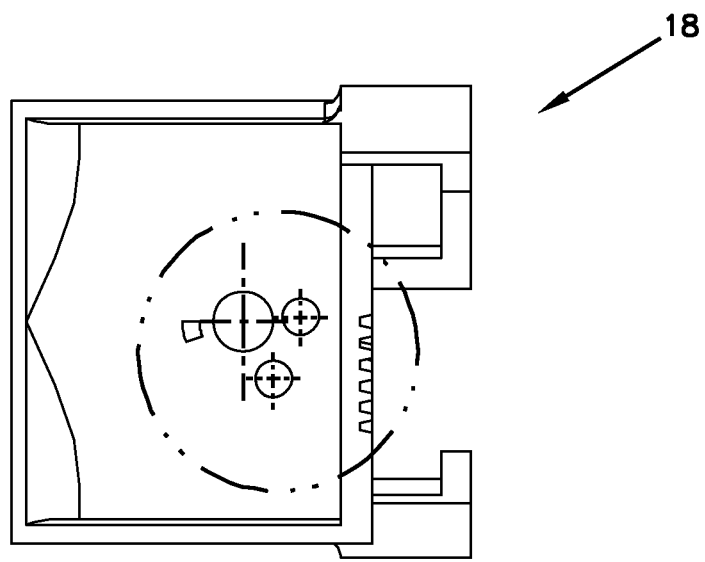
FIG. 10 is a top view of the female assembly main housing of FIG. 8.
Figure 10A:
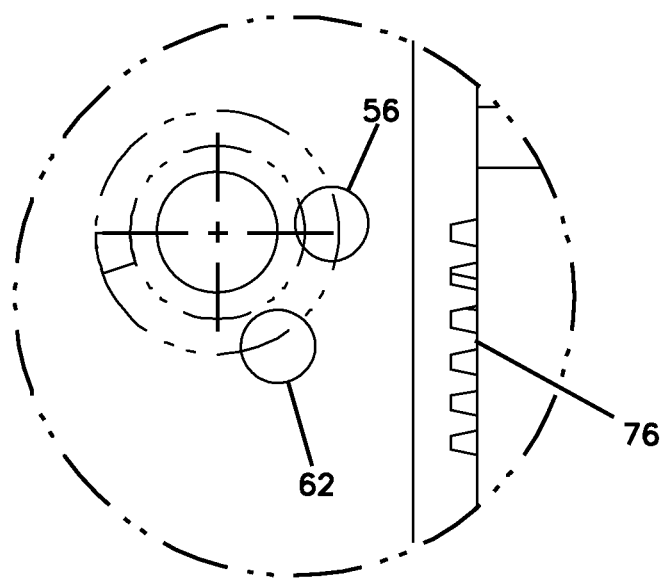
FIG. 10A is a close-up view of a portion of the female assembly main housing of FIG. 10.
Figure 11:
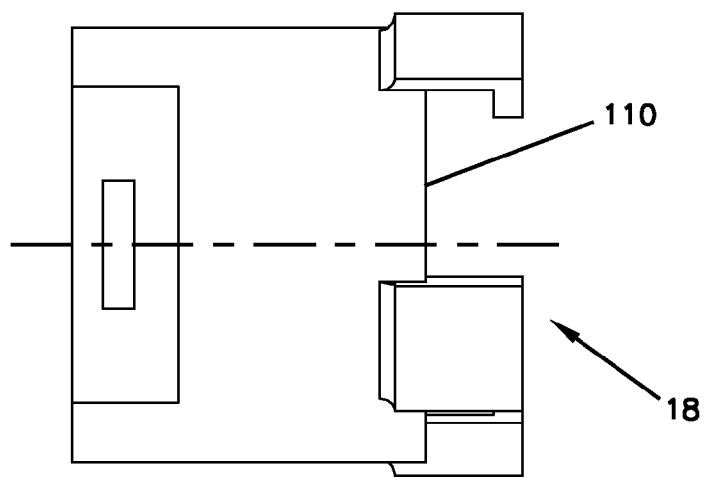
FIG. 11 is a bottom view of the female assembly main housing of FIG. 8.
Figure 12:
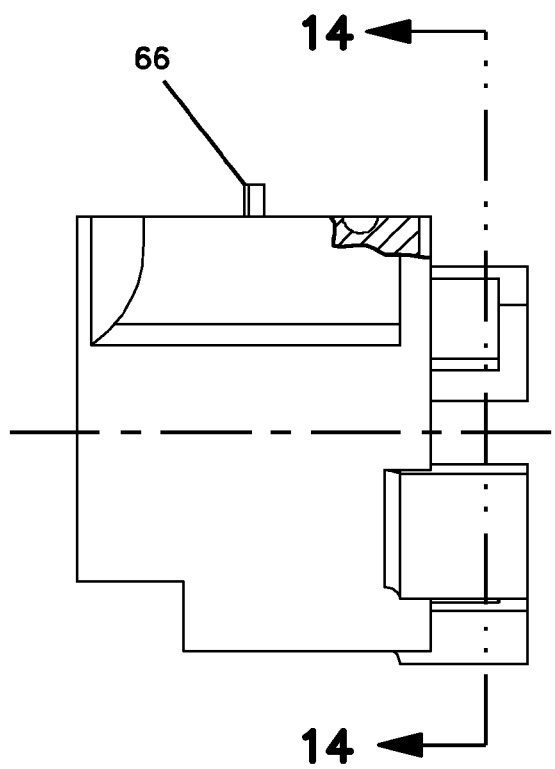
FIG. 12 is a side view of the female assembly main housing of FIG. 8.
Figure 13:
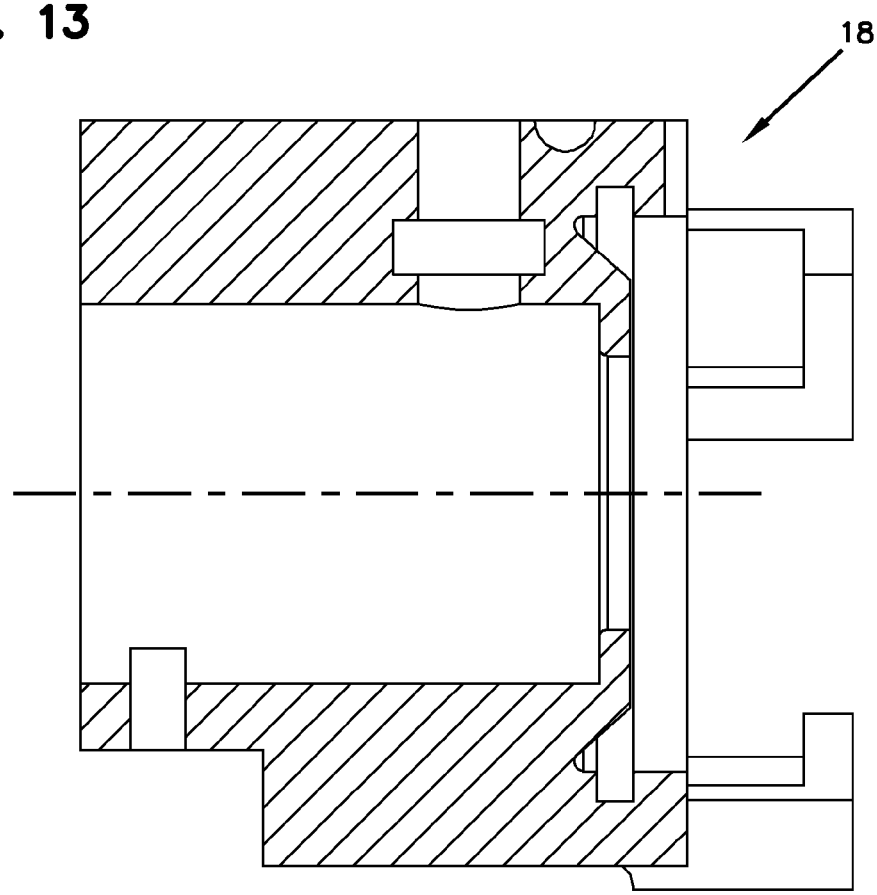
FIG. 13 is a cross-sectional view taken along line 13-13 of FIG. 8.
Figure 14:
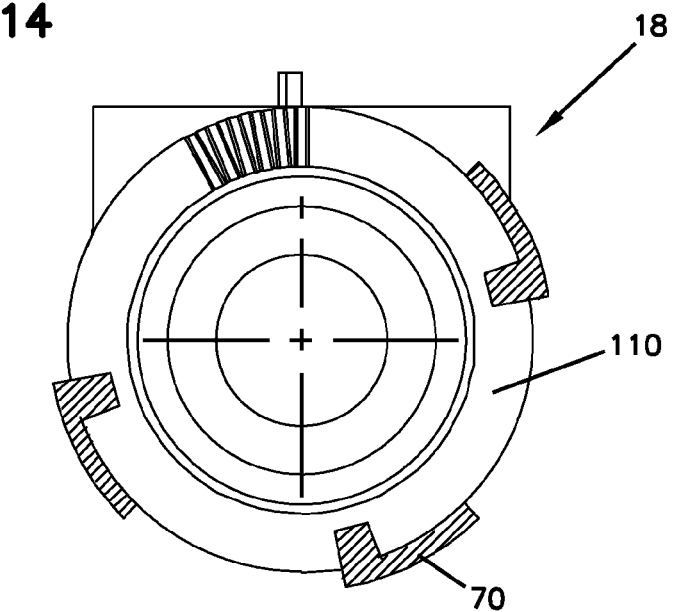
FIG. 14 is a cross-sectional view taken along line 14-14 of FIG. 12.
Figure 22A:
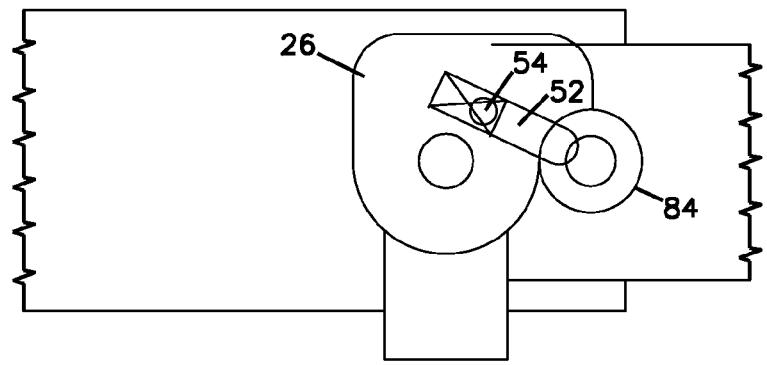
FIGS. 22A-22C diagrammatically illustrate the interaction between the male assembly and the female assembly in releasing the detent ball of the female assembly from a top view.
Figure 22B:
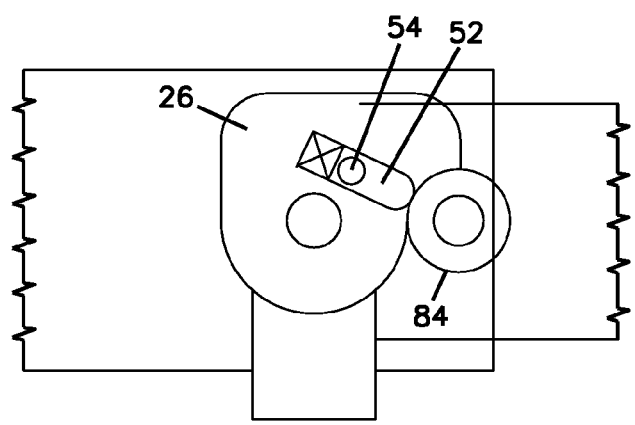
Figure 22C:
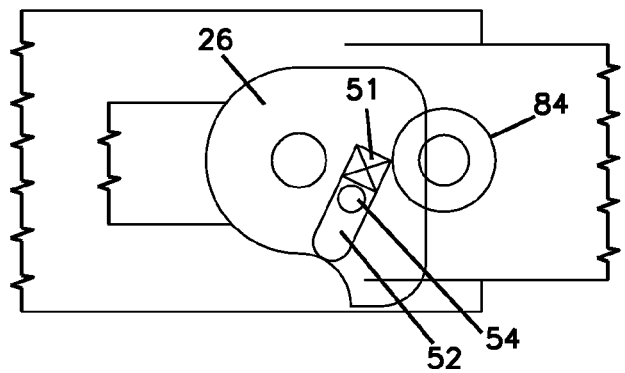
Figure 23A:
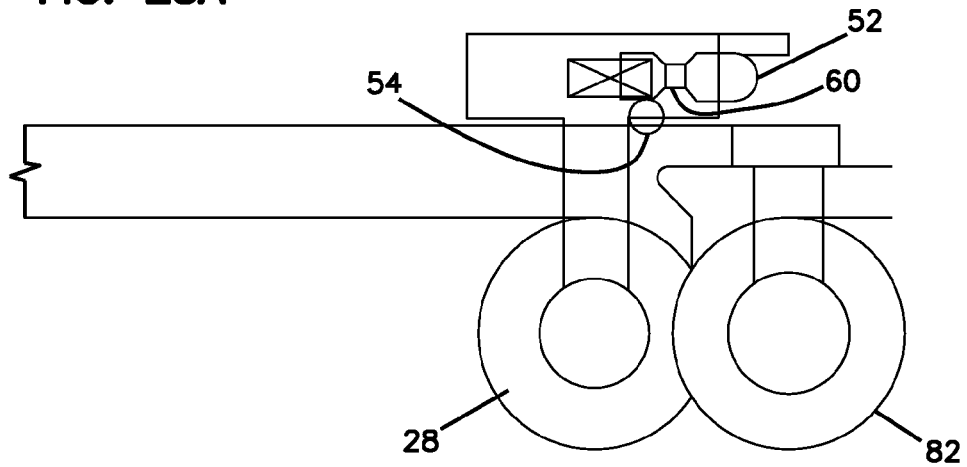
FIGS. 23A-23C diagrammatically illustrated the interaction between the male assembly and the female assembly in releasing the detent ball of the female assembly from a side view.
Figure 23B:
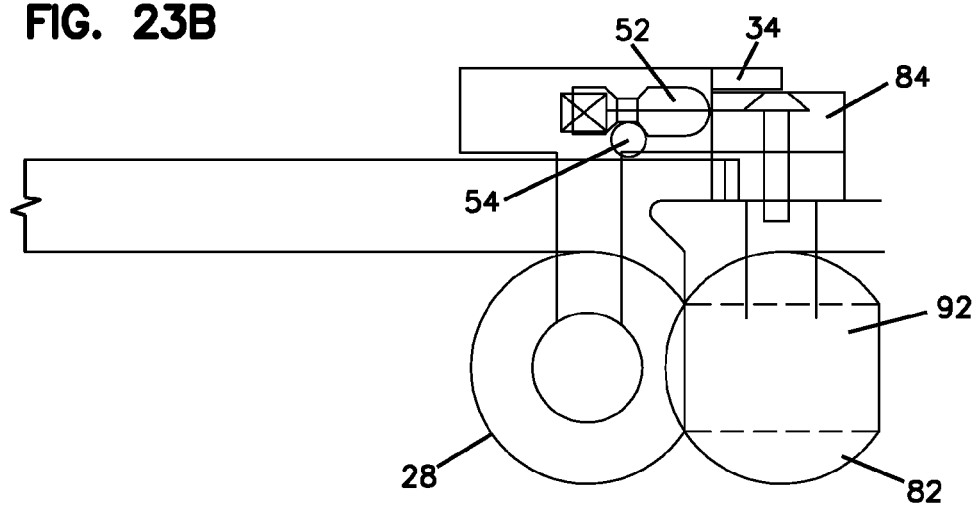
Figure 23C:
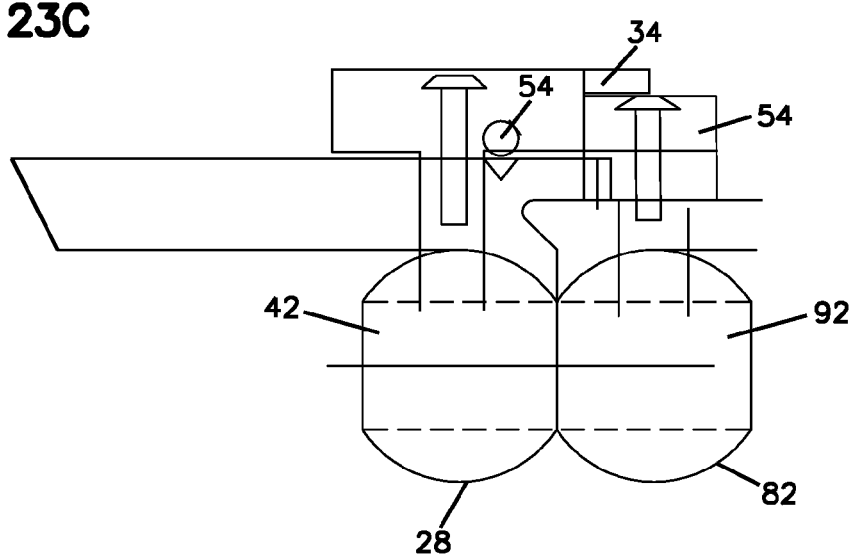

As shown in the cross-sectional view of FIG. 7, the main body 30 of the handle assembly 26 includes a spring loaded lock pin 52 that is used to release a ball detent 54 of the female assembly 12 before the handle 32 can be rotated. When the ball valve 28 is initially in the closed position, the ball detent 54 rests within a first notch 56 (FIG. 10A) defined on an upper face 58 of the main housing 18. When the spring loaded lock pin 52 is pushed against the bias of a spring 51, a recessed portion 60 of the lock pin 52 aligns with the first notch 56 and the ball detent 54 is able to move into the recessed portion 60 and is released from the notch 56 (FIGS. 23A-23B). The handle 32 is able to be turned 90° until the ball detent 54 drops into a second notch 62 defined on the upper face 58 of the main housing 18 (FIG. 10A). At this point, the ball valve 28 is locked in the open position (FIGS. 22C and 23C).

According to the depicted embodiment, the handle assembly 26 can also include a second stop feature for limiting the rotation of the handle 32. A curved slot 64 defined on the main body 30 of the handle assembly 26 receives a roll pin 66 projecting from the upper face 58 of the main housing 18 as shown in FIGS. 3, 5, 8, 9, and 12 to guide the rotation of the handle 32 through a 90° arc and to provide stops at the ends of the slot 64.

Figure 4:
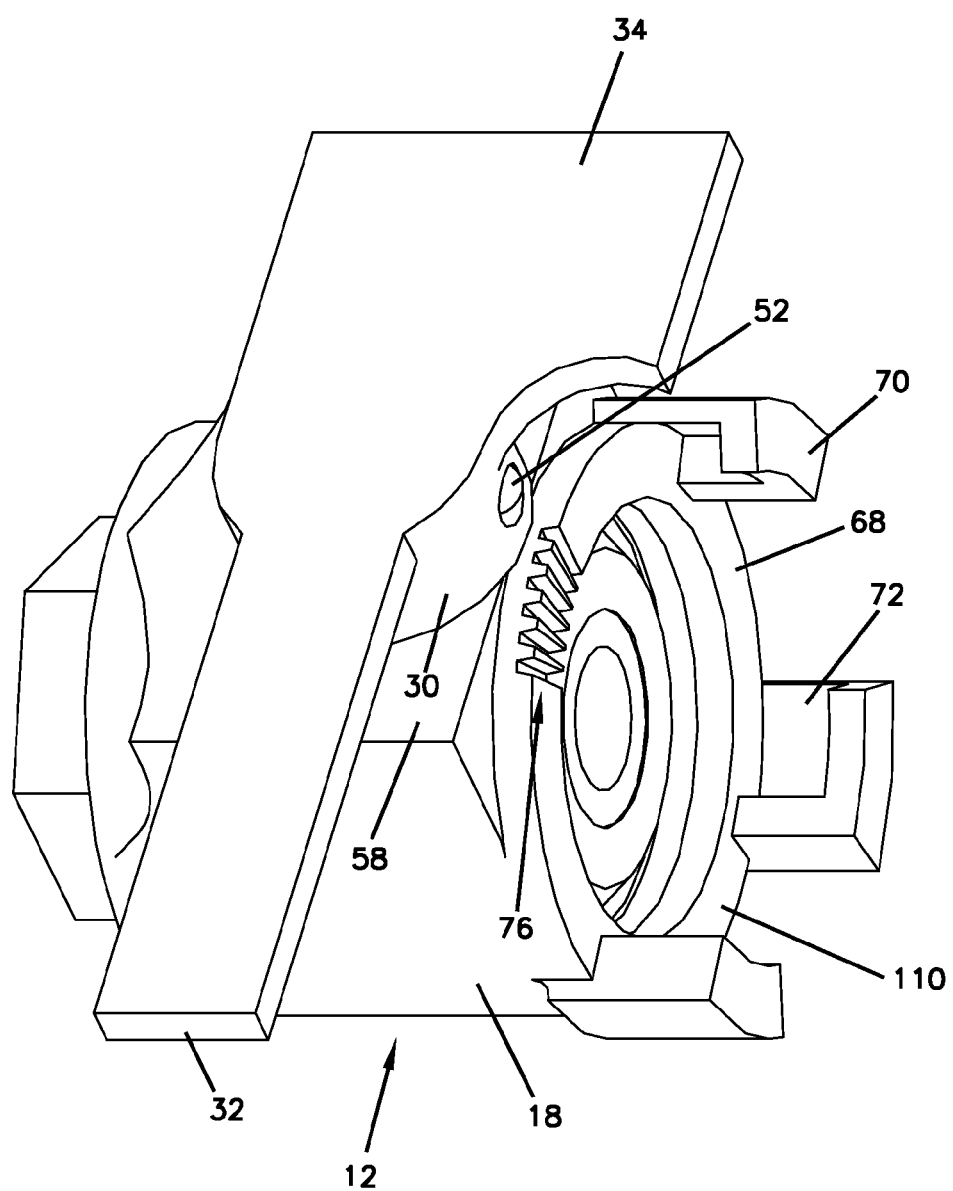
FIG. 4 is a perspective view of the female assembly of the quick connect coupling of FIGS. 1-3, the female assembly shown in the valve-closed position.
Figure 15:
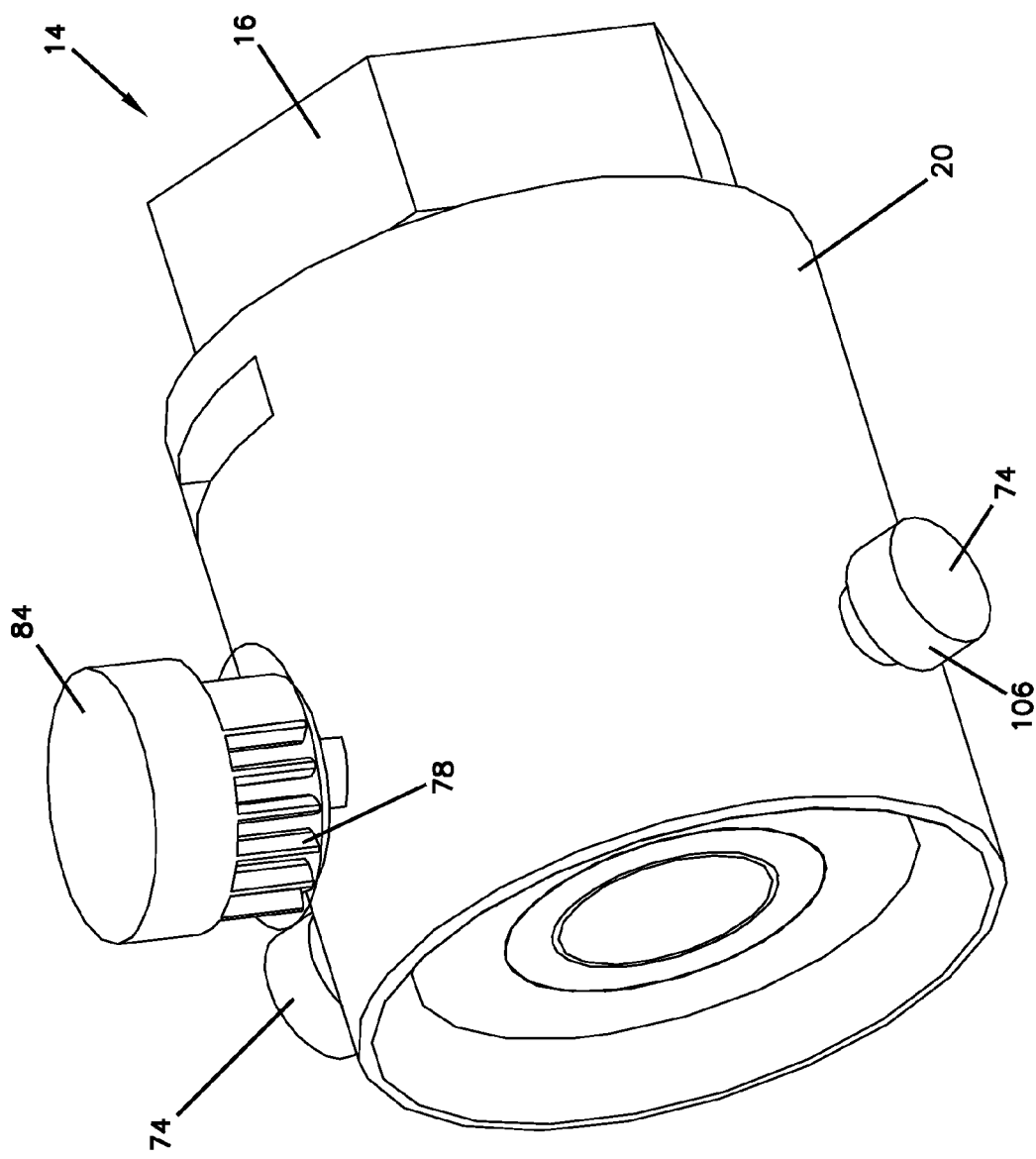
FIG. 15 is a perspective view of the male assembly of the quick connect coupling of FIGS. 1-3.
Figure 16:
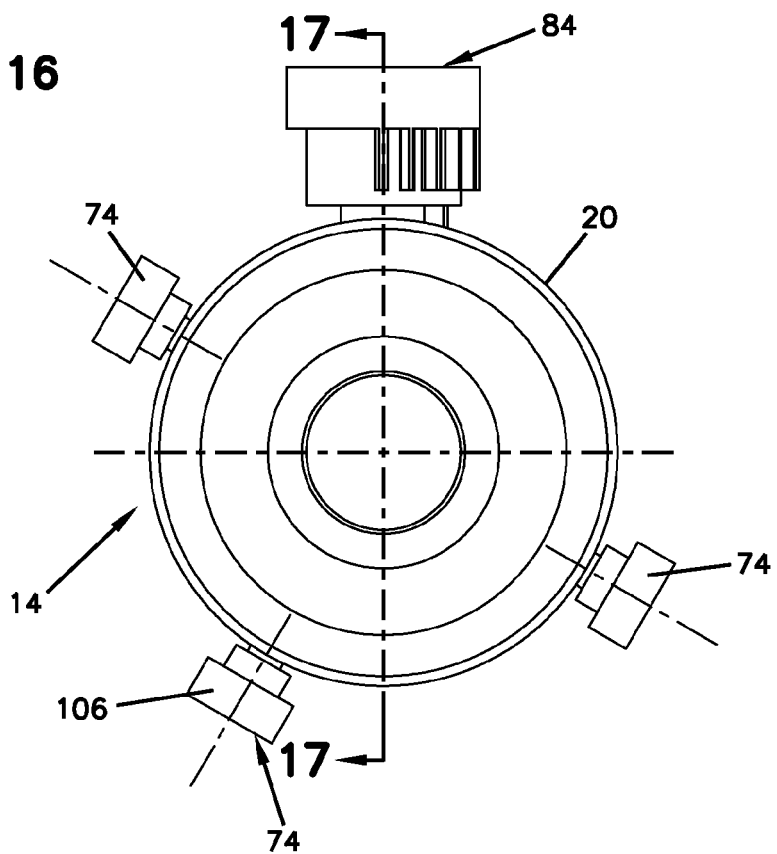
FIG. 16 is a front view of the male assembly of FIG. 15.

The front face 68 of the main housing 18 includes a plurality of fastening structures 70 defining slots 72 that are configured to receive mating pins 74 projecting from the male assembly main housing 20 (FIGS. 4, 15, and 16). The plurality of slots 72 and the pins 74 are configured such that the male assembly 14 and the female assembly 12 are connected together with a "push and turn" connection wherein the male assembly 12 is turned approximately 60°, sliding the pins 74 into the slots 72. As will be described in further detail below, the extension 36 that extends from the main body 30 of the handle assembly 26 is configured to provide a stop for one of the pins 74 once the male assembly 14 is connected and rotated with respect to the female assembly 12. Once the handle 32 is rotated such that the first ball valve 28 is open in the female assembly 12 and the extension 36 is parallel to the longitudinal axis of the main housing 18, the extension 36 provides a stop for the pin 74 such that the pin 74 cannot be slid out of its respective slot 72 and the male assembly 14 cannot be rotatably uncoupled from the female assembly 12.

Also defined on the front face 68 of the main housing 18 is a gear rack 76. As will be discussed in further detail below, the gear rack 76 is configured to intermate with gear teeth 78 located on a rotation shaft 80 of the male assembly 14 when the male assembly 14 and the female assembly 12 are coupled and rotated with respect to each other. The meshing between the gear rack 76 and the gear teeth 78 provide opening and closing of a second ball valve 82 located within the male assembly main housing 20 when the male assembly 14 is rotated relative to the female assembly 12.

As will also be described in further detail below, the top plate 34 defined on the handle assembly 26 provides a second stop to prevent the rotational uncoupling of the male assembly 14 from the female assembly 12. Once the handle 32 is rotated such that the first ball valve 28 is open in the female assembly 12, the plate 34 of the female assembly 12 moves over a head portion 84 of the rotation shaft 80 of the male assembly 14. The spacing between the top plate 34 and the head portion 84 of the shaft 80 is such that the male assembly 14 cannot be rotated without the head 84 of the shaft 80 hitting the plate 34, and, as such, the male assembly 14 cannot be rotatably uncoupled from the female assembly 12.

As such, the male assembly 14 can only be uncoupled from the female assembly 12 and rotated with respect thereto when the first ball valve 28 is in the closed position. Thus, the male assembly 14 can only be rotated with respect to the female assembly 12 when the handle 32 is not parallel to the longitudinal axis of the female assembly main housing 18 and the top plate 34 does not extend past the front face 68 of the female assembly main housing 18.

The same stop features noted above would also apply during the coupling of the male assembly 14 to the female assembly 12. The extension 36 and the top plate 34 would have to be out of the way of the pin 74 and the head 84 of the gear shaft 80, respectively, in order to "push and turn" the male assembly 14 with respect to the female assembly 12.

FIGS. 4-7 illustrate various views of the female assembly 12 with the handle assembly 26 attached to the main housing 18. FIGS. 8-14 illustrate the female assembly main housing 18 in isolation with the handle assembly 26 removed therefrom.

Figure 17:
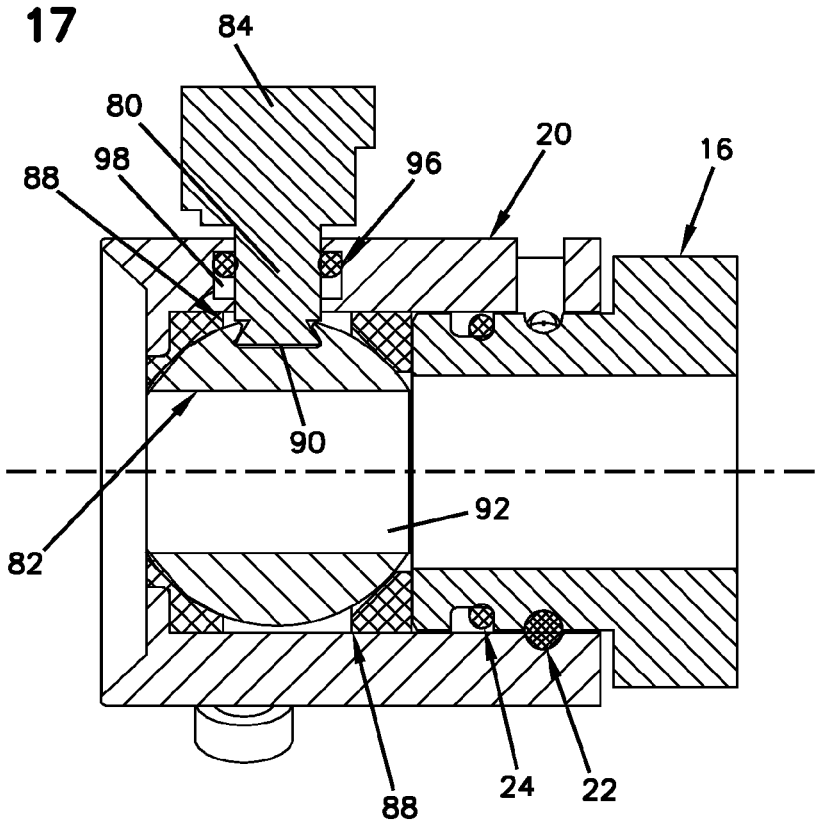
FIG. 17 is a cross-sectional view taken along line 17-17 of FIG. 16.

Referring to FIGS. 15-17, the male assembly 14 is shown in isolation. In addition to the main housing 20 and a swivel adapter 16, the male assembly 14 includes the second ball valve 82. The ball valve 82 may be sealed within the male assembly main housing 20 with a seal 88 (e.g., PTFE). The male assembly 14 includes the rotation shaft 80 for opening and closing the second ball valve 82 within the main housing 20. As in the female assembly 12, the shaft 80 defines a notched end portion 90 that defines a dovetail type interlock with the second ball valve 82. By rotating the shaft about 90°, the throughhole 92 of the ball valve 82 can be aligned with the throughhole 94 defined by the swivel adapter 16 to establish fluid flow. An O-ring 96 is provided to form a seal between the rotation shaft 80 and the bore 98 defined in the male assembly main housing 20 that receives the shaft 80.

The rotation shaft 80 is shown in detail in FIGS. 18-21. As noted above and as seen in FIGS. 18-21, at the upper end of the rotation shaft 80 is defined the head portion 84. The head portion 84 includes a smooth upper end portion 100 having a generally circular configuration and an intermediate stepped-in portion 102 that includes the plurality of gear teeth 78. As noted previously, the gear teeth 78 are configured to intermate with the gear rack 76 defined on the front face 68 of the female assembly main housing 18 when the two assemblies are connected together and rotated with respect to each other. The meshing between the gear teeth 78 and the gear rack 76 provide rotation of the second ball valve 82 located within the male assembly main housing 20 when the male assembly 14 is rotated relative to the female assembly 12. As also will be described below, the smooth upper end portion 100 of the shaft 80 is configured to contact and push in the spring loaded lock pin 52 that is used to release the ball detent 54 of the female assembly 12 before the handle 32 of the female assembly 12 can be rotated. This contact occurs when the male assembly 14 is rotated with respect to the female assembly 12 during the "push and turn" interlock.

Figure 18:
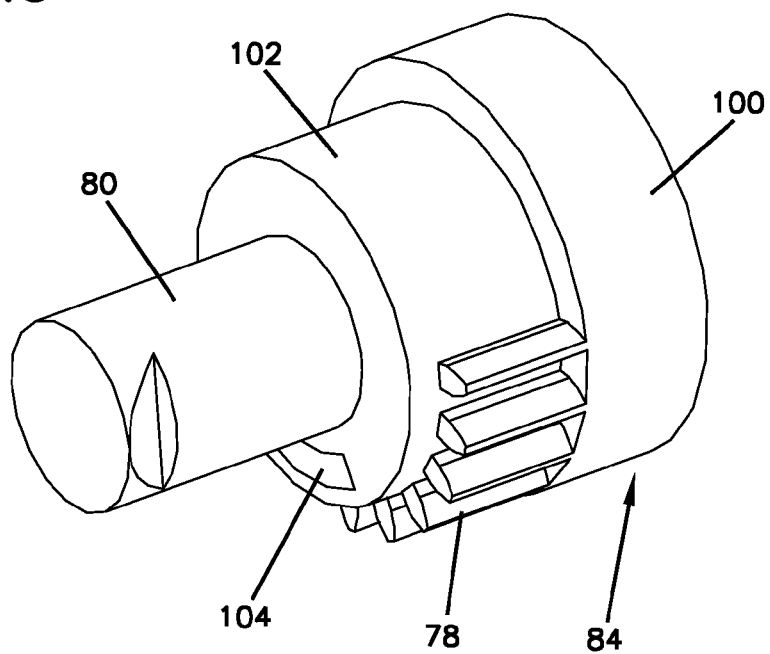
FIG. 18 is a perspective view of the rotation shaft of the male assembly of FIG. 15.
Figure 19:
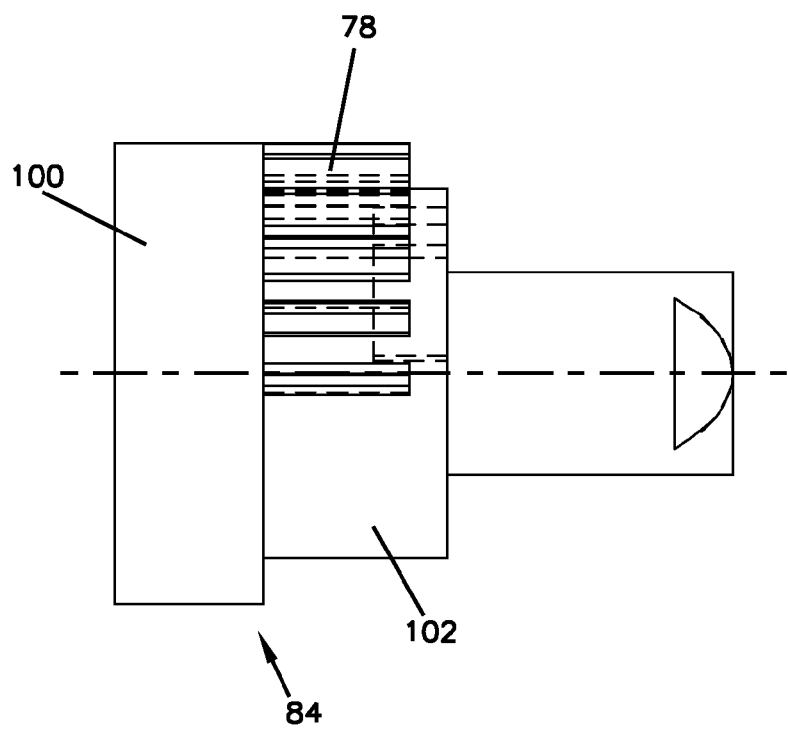
FIG. 19 is a side view of the rotation shaft of FIG. 18.
Figure 20:
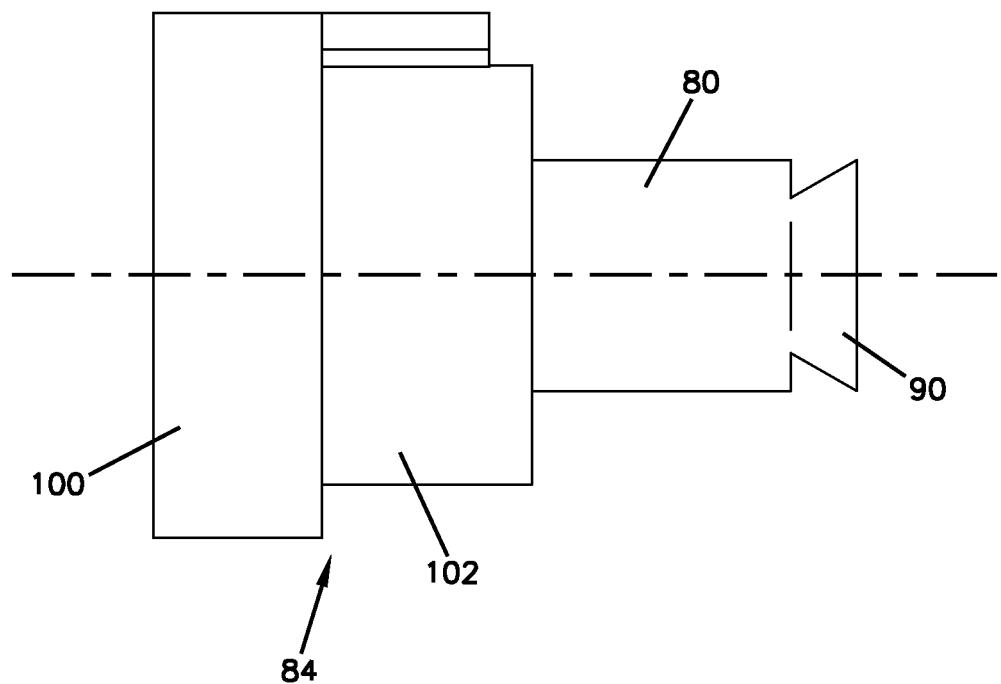
FIG. 20 is another side view of the rotation shaft of FIG. 18, rotated 90 degrees in the axial direction from the view shown in FIG. 19.
Figure 21:
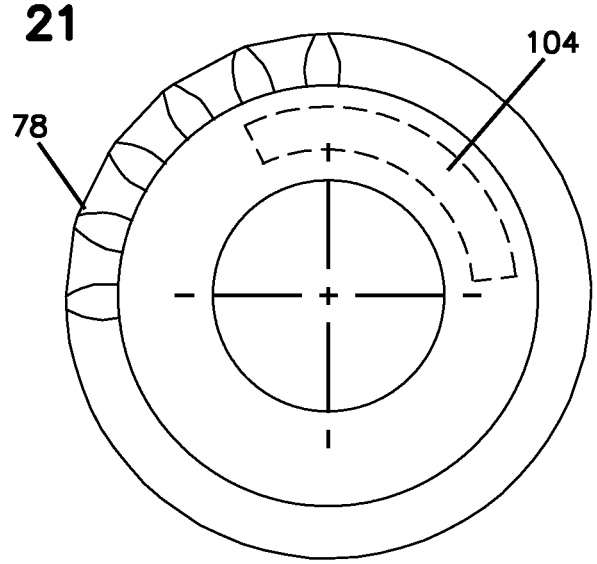
FIG. 21 is a bottom view of the rotation shaft of FIG. 18.

According to the depicted embodiment, similar to that provided for the female assembly 12, the shaft 80 of the male assembly can also include a stop feature for limiting the rotation of the shaft 80. A curved slot 104 defined on intermediate portion 102 of the head 84 of the gear shaft 80 may be configured to receive a roll pin that may project from the upper face 106 of the male assembly main housing 20. The curved slot 104 is shown in FIGS. 18 and 21. The curved slot 104 is configured to guide the rotation of the shaft 80 through a 90° arc and provides stops at the ends of the slot 104.

Now referring back to FIGS. 15-17, the plurality of pins 74 that are configured to mate with the slots 72 of the female assembly 12 project radially outwardly from the male assembly main housing 20. The pins 74 define flanges 106 at the ends thereof. Once the male assembly 14 is pushed against the female assembly 12 and rotated about 60°, the pins 74 slide within the slots 72 defined on the female assembly 12 and the pins 74 are captured therein via their flanges 106 such that the two assemblies 12, 14 cannot be pulled apart in an axial direction without first rotating the male assembly 14 with respect to the female assembly 12.

Figure 5:
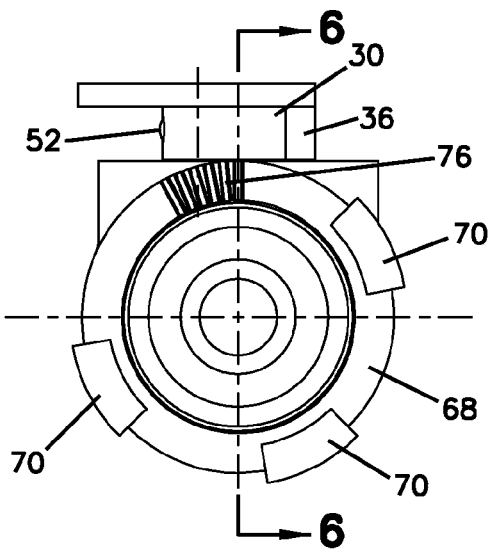
FIG. 5 is a front view of the female assembly of FIG. 4, the female assembly shown in the valve-open position.
Figure 6:
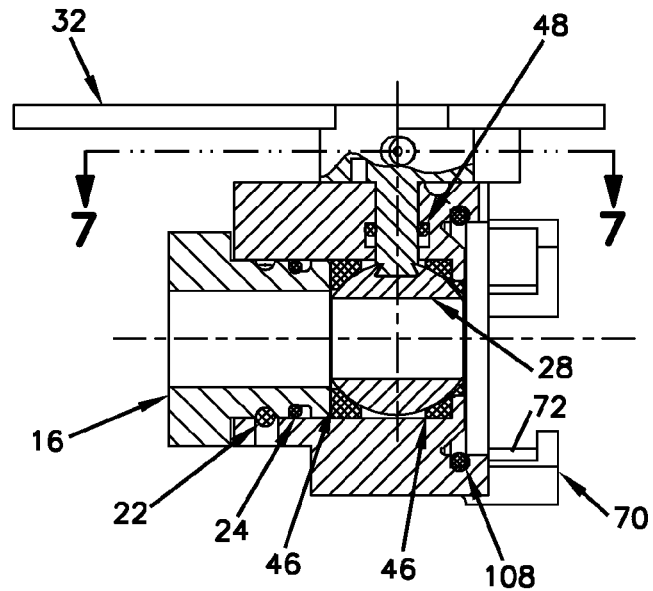
FIG. 6 is a cross-sectional view taken along line 6-6 of FIG. 5.

As shown in the cross-sectional views of FIGS. 3 and 5, the connection between the female assembly 12 and the male assembly 14 may be sealed with an O-ring 108 located within the female assembly main housing 18.

It should be noted that the pin/slot interlock between the male assembly 14 and the female assembly 12 is simply one example embodiment of a "push and turn" connection between the male assembly 14 and the female assembly 12 and other structures may be used to provide a similar type connection. For example, FIGS. 25-32 illustrate another embodiment of a quick connect coupling 210 according to the present disclosure that defines axial projecting lock pins 272 on the female assembly 212 and hook fasteners 270 located on the male assembly 214. The lock pins 272 and the hook fasteners 270 provide a similar "push and turn" interlock between the male assembly 214 and the female assembly 212 wherein flanges 306 of the lock pins 272 abut against outer surfaces 274 of the hook fasteners 270 to prevent axial separation of the two assemblies 212, 214.

It will be noted that, aside from the differences in structures used for connection, the embodiment of the quick connect coupling 210 shown in FIGS. 25-32 includes similar features and operates in a similar manner to that of the embodiment 10 illustrated in FIGS. 1-24.

Referring back to FIGS. 1-3, as will be described in further detail below, the design of the male and the female assemblies 14, 12 of the quick connect coupling 10 provide for a certain sequencing of the opening and closing of the valves 28, 82 such that safe operation of the coupling 10 is established.

Since a concave/convex ball design requires the valve openings to be sequenced in a certain order as is known in the art (the convex ball valve has to be opened first while the ball valves are in a nested position), the connection between the male assembly 14 and the female assembly 12 does not leave any room for error in sequencing the valve opening. After the latch pins 74 on the male assembly 14 are engaged into the slots 72 on the female assembly 12, the coupling assemblies are rotated about 60° to complete the connection. This rotation opens the convex ball valve 82 within the male assembly main housing 20 first via the gear rack and pinion arrangement described above. Then the handle 32 on the female assembly 12 is rotated to open the concave ball valve 28 second. This provides the proper sequencing of ball opening/closing.

The first ball valve 28 located within the female assembly main housing 18 and the second ball valve 82 located within the male assembly main housing 20 remain closed when the two assemblies 12, 14 are disconnected and there is preferably no means to open the valves while the two assemblies 12, 14 are disconnected.

As noted, the gear teeth 78 located on the rotation shaft 80 of the male assembly 14 and the gear rack 76 defined on the female assembly main housing 18 cooperate to open the second ball valve 82 located within the male assembly main housing 20 during coupling of the two assemblies 12, 14 together. And, only thereafter can the handle 32 located on the female assembly main housing 18 be rotated to open the first ball valve 28 located within the female assembly main housing 18 to establish fluid flow.

Also, during disconnection, the handle 32 of the female assembly 12 interacts with the head portion 84 of the rotation shaft 80 of the male assembly 14 such that only after the handle 32 has been rotated to close the first ball valve 28 of the female assembly 12 can the male assembly 14 be rotated for disconnection. And, when the male assembly main housing 20 is rotated relative to the female assembly main housing 18 for disconnection, the second ball valve 82 is automatically closed via the interaction of the gear teeth 78 and the gear rack 76.

As such and as will be described in further detail below, the quick connect coupling 10 of the present disclosure includes safety interlocks that perform to 1) prevent valve opening when the coupling halves are disconnected; 2) lock valves in closed or open positions; and 3) prevent disconnection of coupling halves while either valve is open.

Figure 24A:
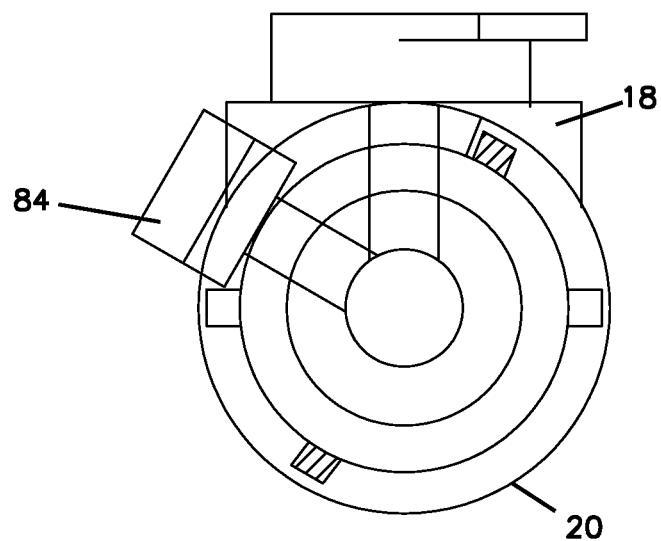
FIGS. 24A-24B diagrammatically illustrate the rotational coupling of the male assembly to the female assembly.
Figure 24B:
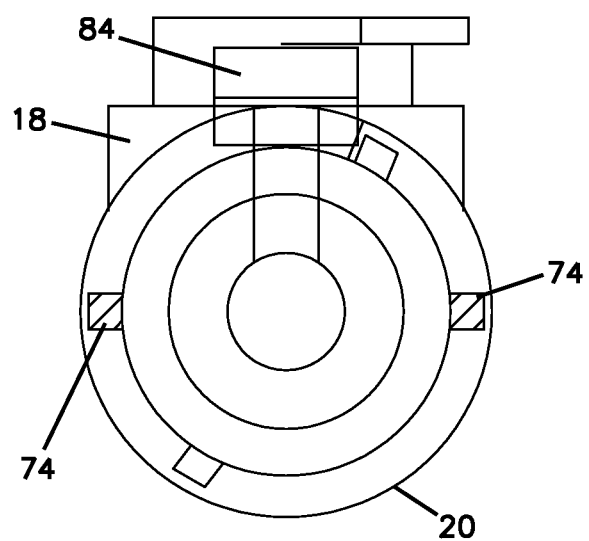
Figure 25:
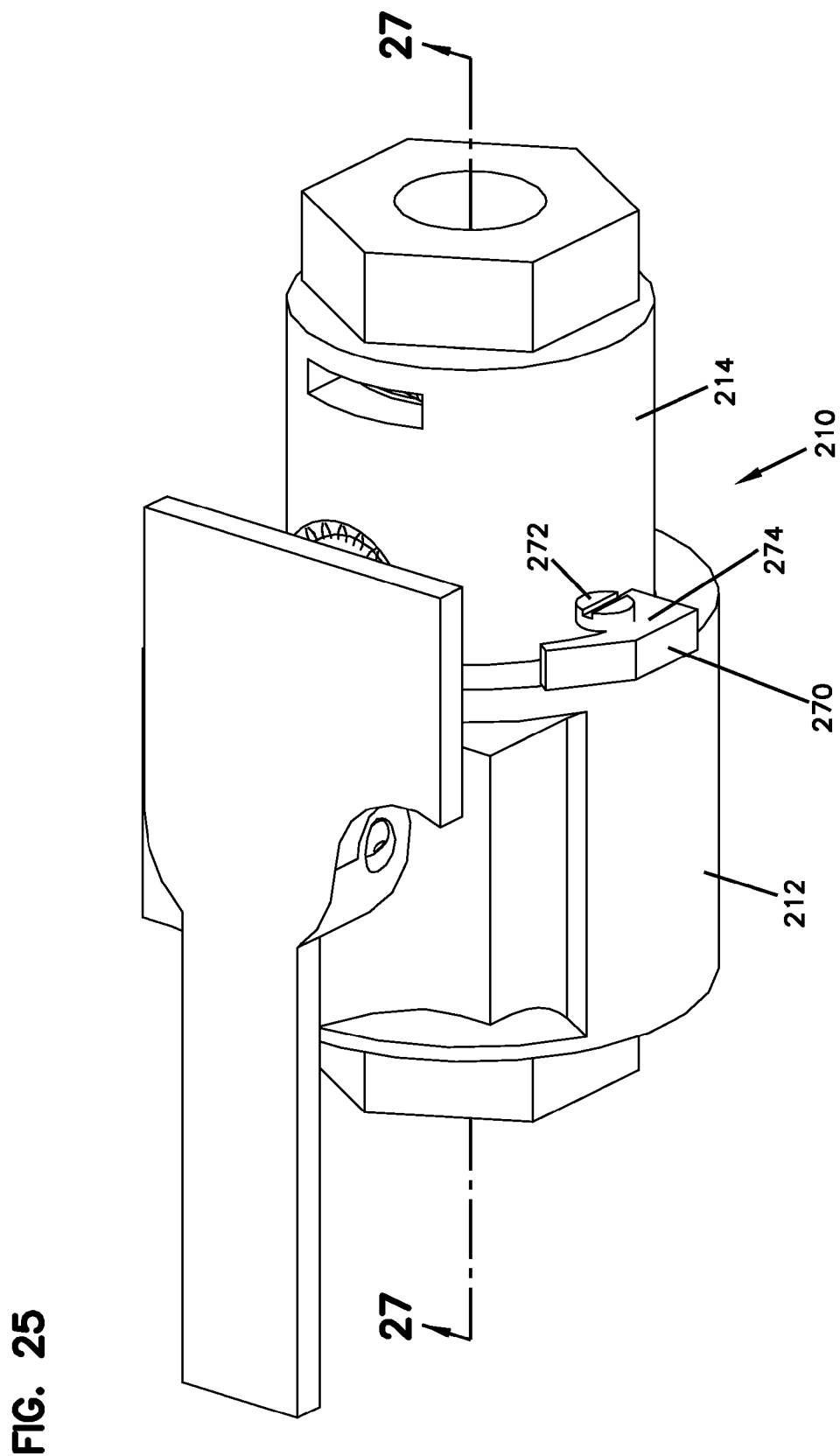
FIG. 25 is a perspective view of another embodiment of a quick connect coupling having features that are examples of inventive aspects in accordance with the present disclosure.
Figure 26:
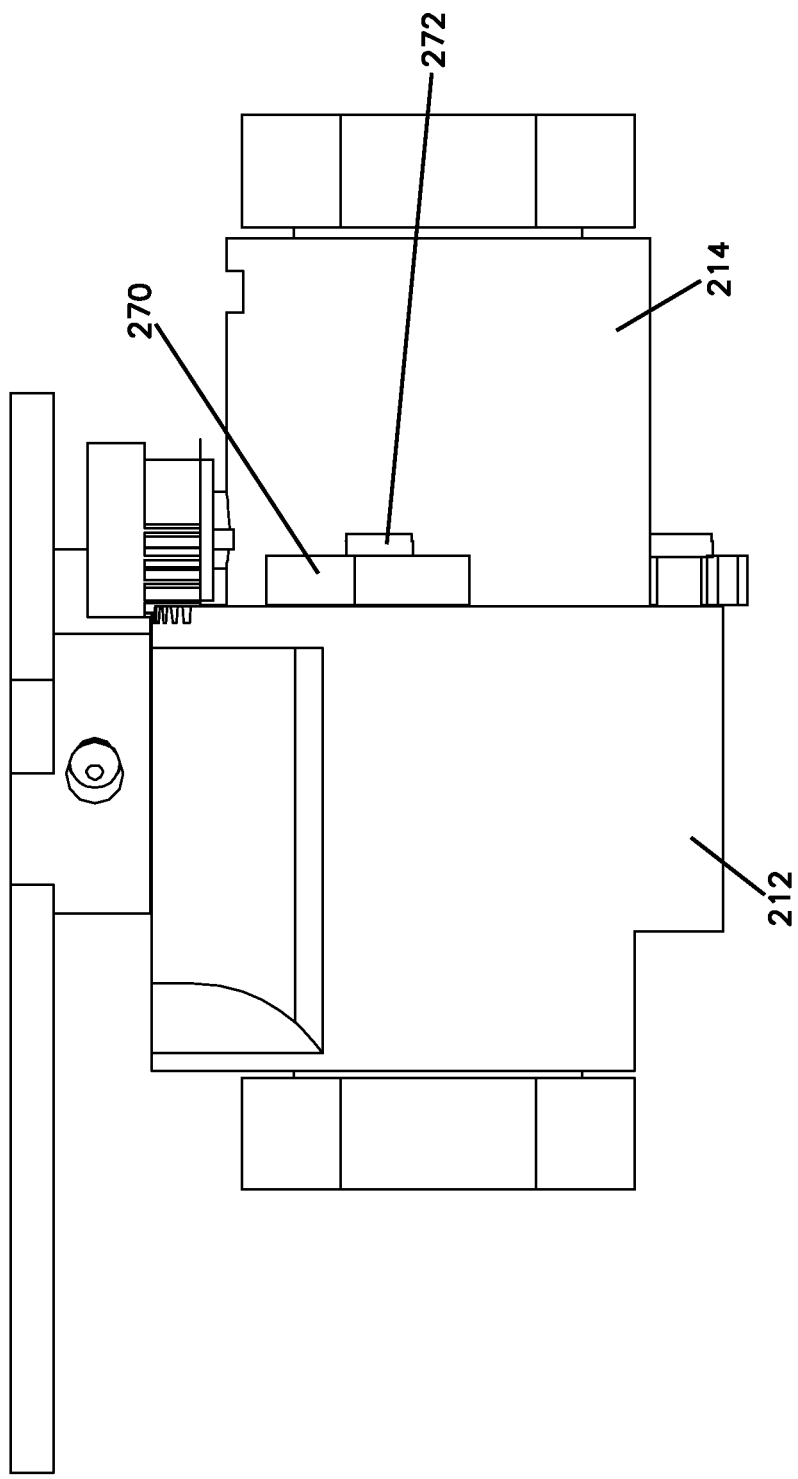
FIG. 26 is a side view of the quick connect coupling of FIG. 25.
Figure 27:
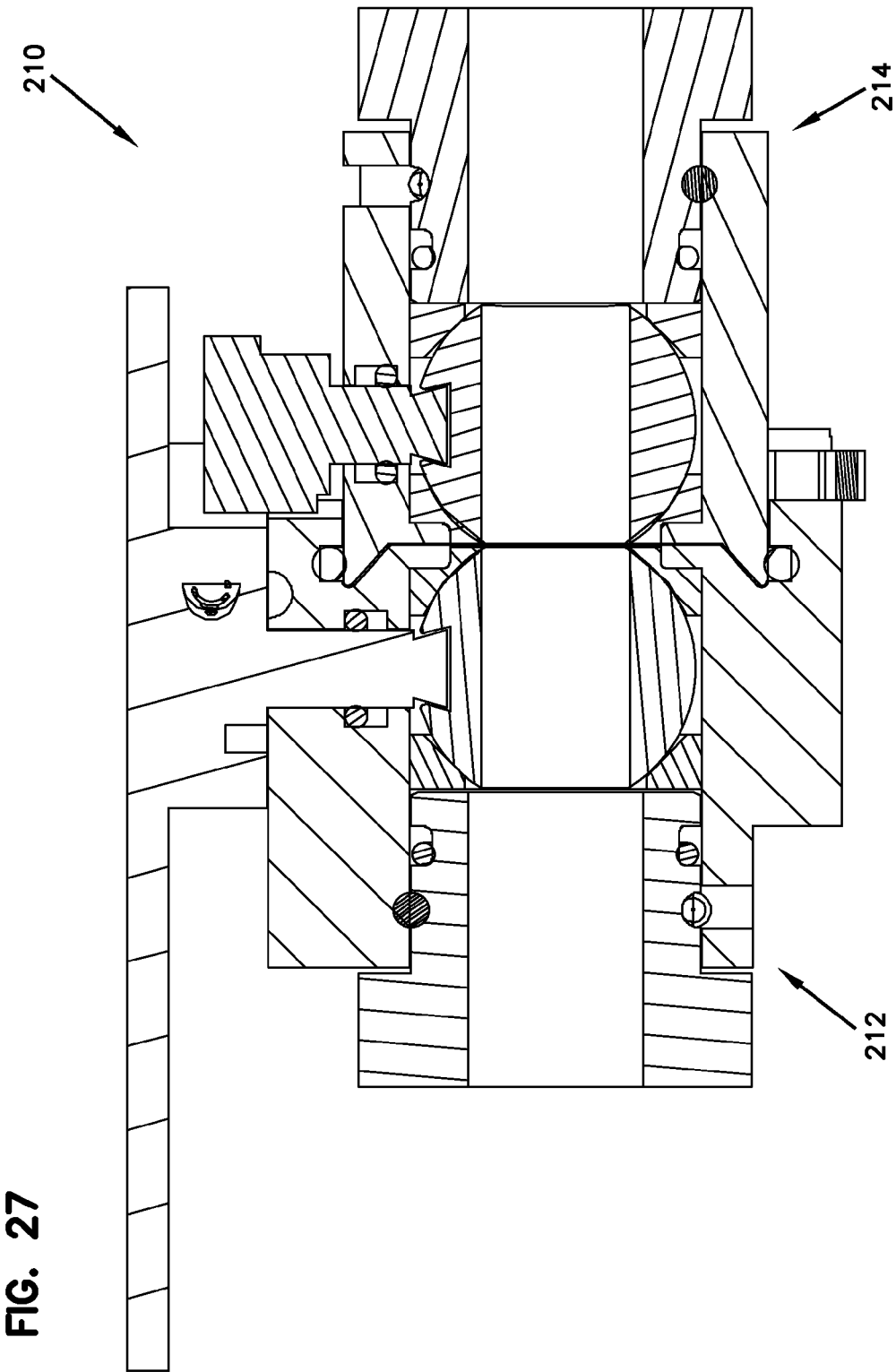
FIG. 27 is a cross-sectional view taken along line 27-27 of FIG. 25.
Figure 28:
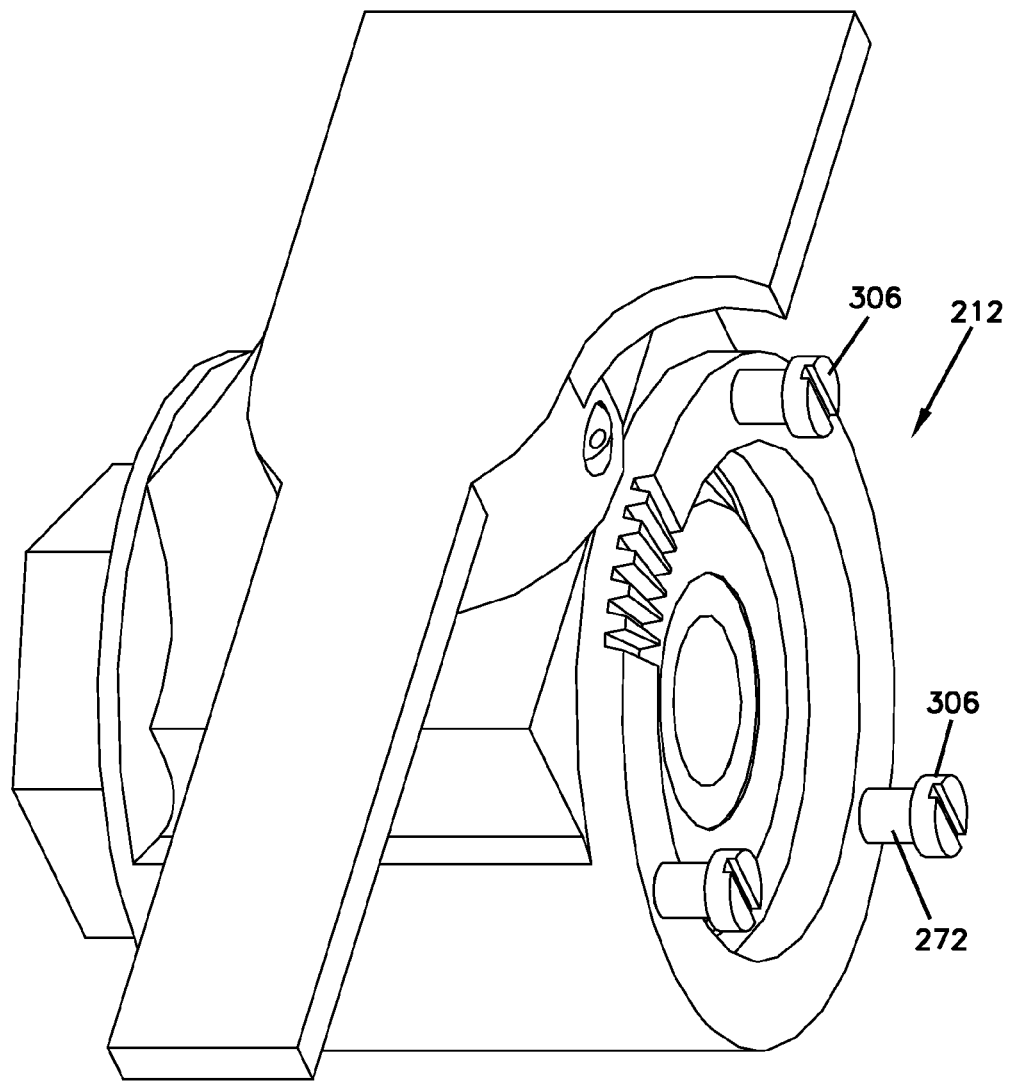
FIG. 28 is a perspective view of the female assembly of the quick connect coupling of FIGS. 25-27, the female assembly shown in the valve-closed position.
Figure 29:
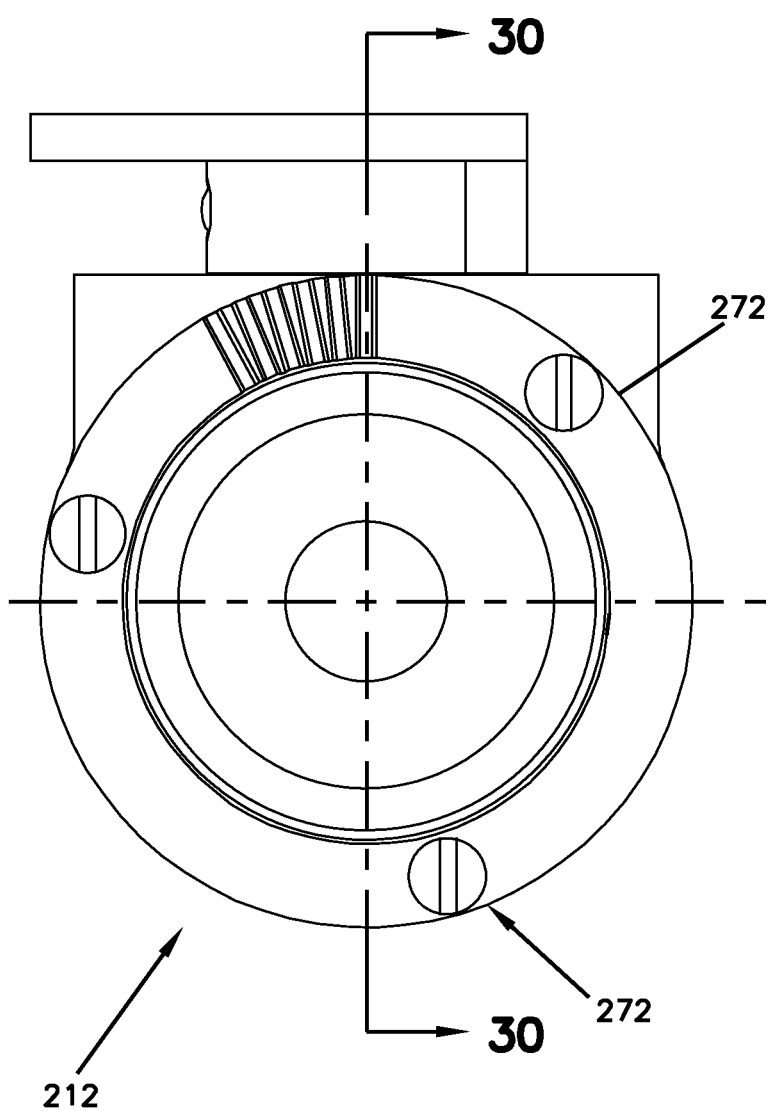
FIG. 29 is a front view of the female assembly of FIG. 28, the female assembly shown in the valve-open position.
Figure 30:
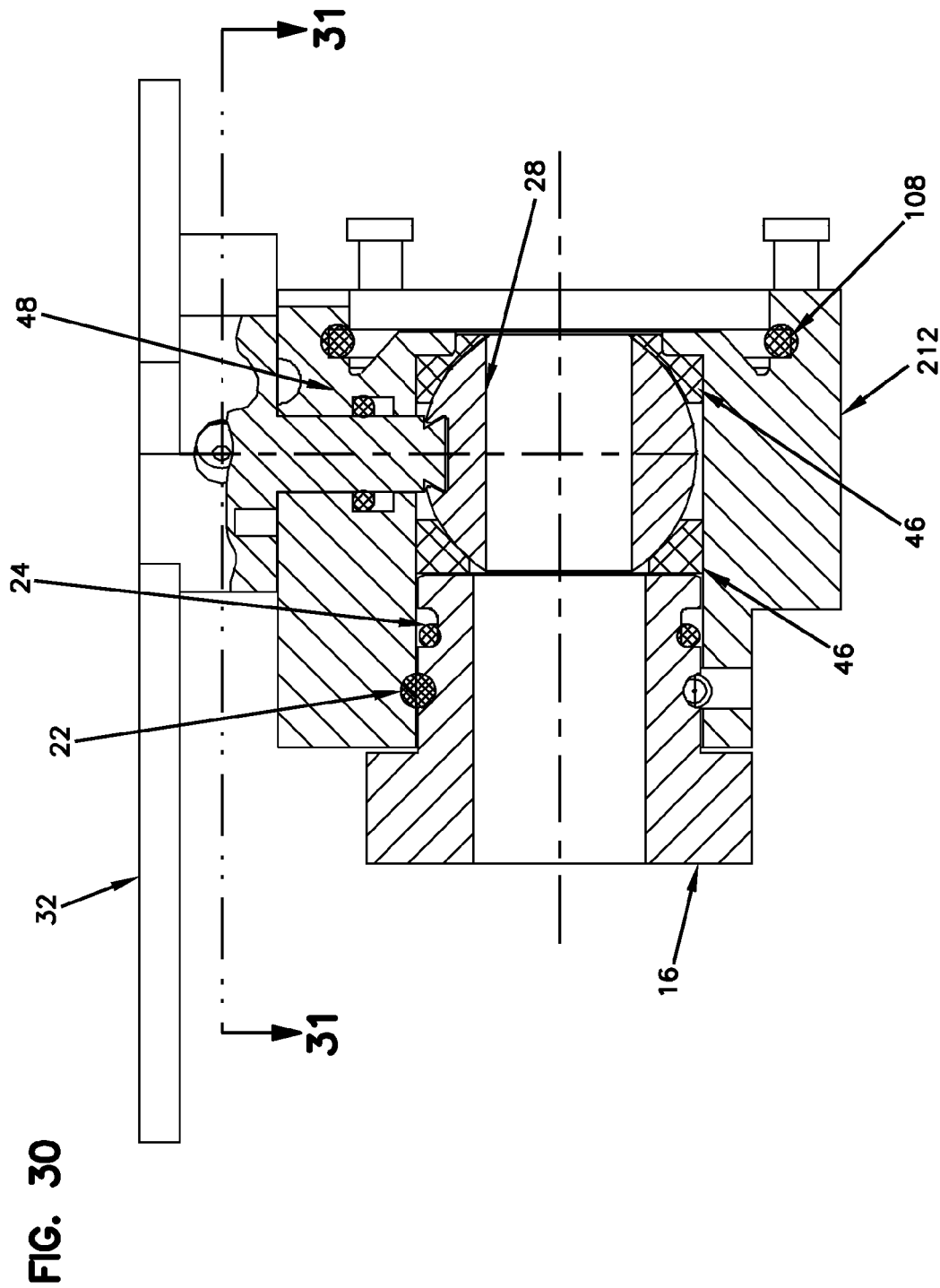
FIG. 30 is a cross-sectional view taken along line 30-30 of FIG. 29.
Figure 31:
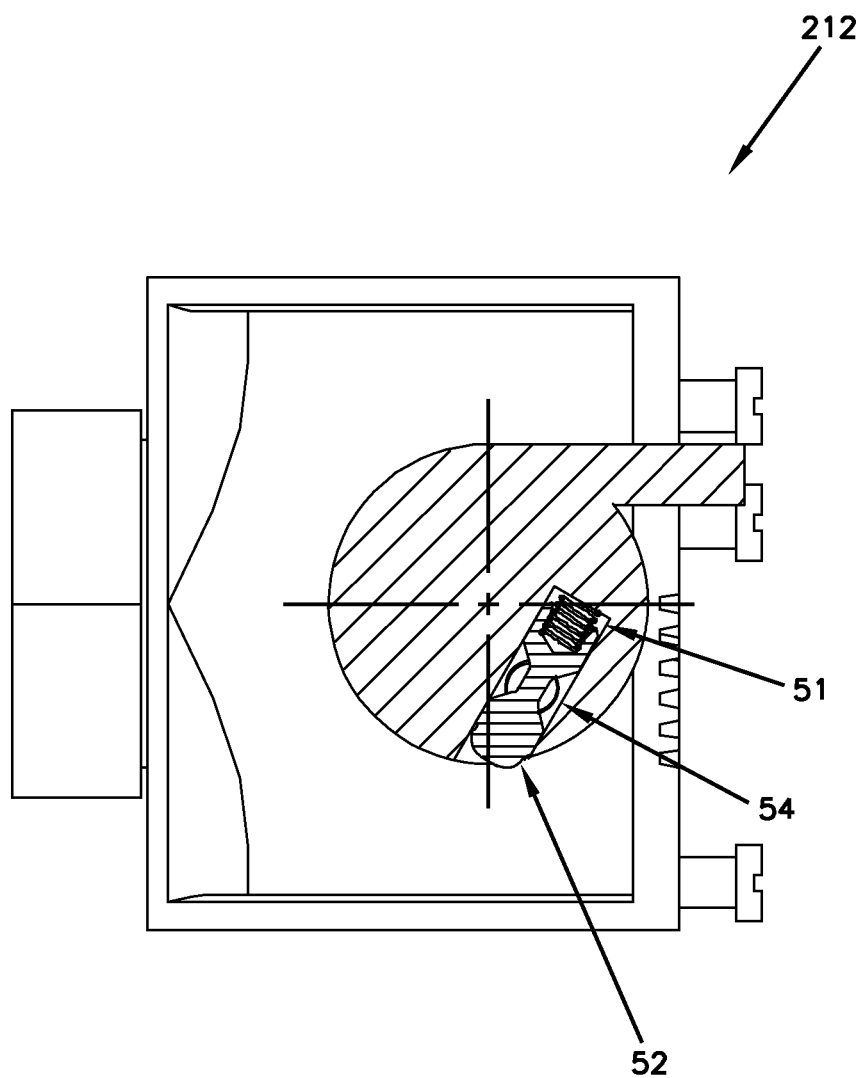
FIG. 31 is a cross-sectional view taken along line 31-31 of FIG. 30.
Figure 32:
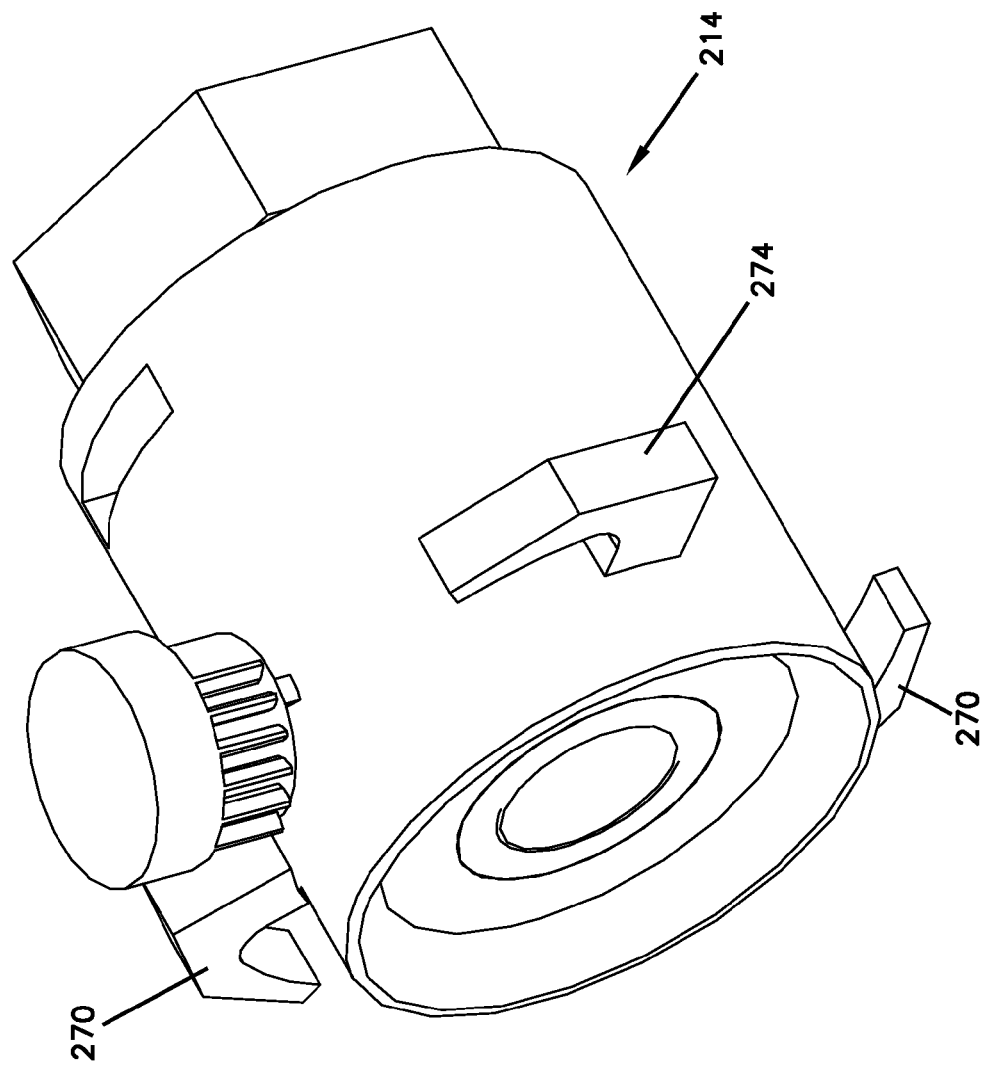
FIG. 32 is a perspective view of the male assembly of the quick connect coupling of FIGS. 25-27.

The operation of the quick connect coupling 10 will now be described. As noted above, when the male assembly 14 and the female assembly 12 are not connected, the spring loaded pin 52 in the main body 30 of the handle assembly 26 of the female assembly 12 prevents opening of the first ball valve 28 until the spring loaded pin 52 is depressed. The male and the female assemblies are designed such that the spring loaded pin 52 is depressed when the male assembly 14 is connected to the female assembly 12 and rotated relative thereto. When the male assembly 14 is rotated about 60° relative to the female assembly 12, the smooth portion 100 of the generally circular head portion 84 of the shaft 80 of the male assembly 14 makes contact with the spring loaded pin 52. Through a camming action between the rounded tip of the spring loaded pin 52 and the curved surface of the smooth portion 100, the spring loaded pin 52 is pushed to release the ball detent 54 to allow the handle 32 to be turned. This rotational action of the male assembly 14 with respect to the female assembly 12 is illustrated in FIGS. 24A-24B.

Rotation of the male assembly 14 with respect to the female assembly 12 also opens the second ball valve 82 within the male assembly main body 20 due to the meshing of the gear teeth 78 and the gear rack 76. The second ball valve 82 in the male assembly 14 can not normally be opened while disconnected from the female assembly 12 because an operator would not be able to exert enough torque simply through the gear shaft 80 to rotate the second ball valve 82 into an open position. A mechanical advantage is provided to rotate the second ball valve 82 into an open position through the rack/pinion gear arrangement when the two assemblies 12, 14 are rotated relative to one another.

In connecting the two assemblies 12, 14, the pins 74 on the male assembly 14 are aligned with spaces 110 between the fastening structures 70 of the female assembly 12. The male assembly 14 is pushed into the female assembly 12 and rotated about 60° to slidably insert the pins 74 into the slots 72. This action connects the two assemblies 12, 14 and also opens the second (convex) ball valve 82.

Thus, the male ball valve 82 is opened automatically during the connection process as noted above.

Opening of the female ball valve 28 requires an operator to turn the handle 32 of the female assembly 12 to open the female ball valve 28. When the coupling assemblies 12, 14 are fully connected and the male assembly 14 is rotated into place, the head portion 84 of the gear shaft 80 aligns with the spring loaded pin 52 of the female assembly 12 and depresses the spring loaded lock pin 52, allowing the handle 32 to be rotated. This action releases the ball detent 54 that holds the handle 32 in the closed position. This is shown in FIGS. 22A-22C and 23A-23C. As the handle 32 is rotated, the top plate 34 defined by the handle assembly 26 slides over the top of the head portion 84 of the rotation shaft 80 of the male assembly 14. As noted previously, this prevents rotation/disconnection of the coupling assemblies while the valves 28, 82 are open. In addition, as noted above, as the handle 32 is rotated, the extension 36 that extends from the main body 30 of the handle assembly moves to block the pin 74 of the male assembly 14 within the slot 72 of the female assembly 12 such that the pin 74 cannot be slid out of its respective slot 72 and the male assembly 14 cannot be rotatably uncoupled from the female assembly 12. When the handle 32 has been rotated 90°, the extension 36 is positioned parallel to the longitudinal axes of the coupling assemblies 12, 14 (see FIG. 6). When the handle 32 has been rotated 90°, both valves 28, 82 are open and the ball detent 54 drops into the second notch 62 on the female assembly main housing 18 and holds the valves 28, 82 in the wide open position.

The ball valves 28, 82 are closed by reversing the process described above. First, the operator must depress the spring loaded pin 52 on the side of the main body 30 of the handle assembly 26. This action releases the ball detent 54 that holds the first ball valve 28 in the open position. While depressing the spring loaded pin 52, the operator must rotate the handle 32 to the closed position to close the concave ball valve 28. When the handle 32 reaches the closed position, the ball detent 54 drops into the first notch 56 on the female assembly main housing 18 and holds the first ball valve 28 in the closed position. Also, at this point, neither the top plate 34 nor the extension 36 of the female assembly 12 prevents rotation of the male assembly 14 with respect to the female assembly 12 and the two assemblies can be disconnected.

The rotating action to disconnect the coupling assemblies closes the convex second ball valve 82 (through the rack/pinion arrangement) and allows the latch pins 74 to disengage the slots 72.

The spring loaded pin 52 in the main body 30 of the handle assembly 26 is configured to lock the handle 32 such that it is difficult to turn the handle 32 to an open position again until the male assembly 14 is re-connected to the female assembly 12.

Even though in the depicted embodiment, certain seals are provided with simple O-ring seals, other types of pressure or spring energized seals may be used, for example, for the ball valves 28, 82.

The pin and slot latch mechanism shown is simply one example embodiment of a connection arrangement for connecting the male assembly 14 to the female assembly 12 and other latching arrangements can be used. For example, as noted above, FIGS. 25-32 illustrates another example embodiment of a connection arrangement.

According to certain embodiments, the main housings of the male and the female assemblies may be made of stainless steel, as may the pins and the springs. Molded composite material may be utilized for the ball valves, ball shafts, handle and gears. Zinc is another material that may be suitable for the gears or the handle.

It is recognized that tolerances and sliding friction can affect the proper operation and sequencing of the valve opening in the described quick connect coupling mechanisms 10, 210. The gear sizes can be determined by the torque/force required to open the ball valves.

Although in the foregoing description, terms such as "top", "bottom", "front", "back", "right", "left", "upper", and "lower" may have been used for ease of description and illustration, no restriction is intended by such use of the terms. The quick connect couplings described herein can be used in all orientations, depending upon the desired application.

The above specification, examples and data provide a description of the configuration and use of the devices therein. However, many embodiments of the disclosure can be made without departing from the spirit and scope of the inventive aspects.

The invention claimed is:

1. A quick connect coupling comprising:
a female assembly including a first valve configured to be operable between an open position and a closed position;
a male assembly configured to be coupled to the female assembly, the male assembly including a second valve configured to be operable between an open position and a closed position;
wherein the male assembly is connected to the female assembly by moving the two assemblies axially toward each other and rotating the two assemblies relative to each other, wherein during connection of the two assemblies, relative rotation of the male assembly with respect to the female assembly moves the second valve from the closed position to the open position;
wherein the male assembly is disconnected from the female assembly by rotating the two assemblies relative to each other and axially separating the two assemblies from each other;
wherein relative rotation of the two assemblies moves the second valve between the open position and the closed position;
wherein movement of the second valve from the closed position to the open position allows the first valve of the female assembly to be movable from the closed position to the open position;
wherein movement of the first valve from the closed position to the open position limits relative rotation between the two assemblies and prevents disconnection of the two assemblies such that the two assemblies can only be disconnected when the first valve has been moved to the closed position and wherein disconnection of the two assemblies moves the second valve from the open position to the closed position; and
wherein the second valve is rotatable between the open position and the closed position via a shaft, the shaft including a first set of gear teeth that are configured to mesh with a second set of gear teeth of the female assembly when the male and female assemblies are rotated relative to each other, turning the shaft.

2. A quick connect coupling according to claim 1, wherein the female assembly includes a handle assembly defining a handle connected to a shaft for rotating the first valve between the open and closed positions, wherein when the two assemblies are connected to each other, a portion of the handle assembly prevents relative rotation of the two assemblies when the first valve has been rotated to the open position via the handle.

3. A quick connect coupling according to claim 1, wherein during connection of the two assemblies, relative rotation of the male assembly with respect to the female assembly releases a ball detent of the female assembly for allowing the first valve to be brought to the open position.

4. A quick connect coupling according to claim 1, wherein the first and second valves are nested ball valves.

5. A quick connect coupling according to claim 1, wherein the two assemblies cannot be coupled and rotated relative to each other when either of the first valve or the second valve is in the open position.

6. A quick connect coupling according to claim 5, wherein the two assemblies cannot be rotated relative to each other and disconnected from each other when either of the first valve or the second valve is in the open position.

7. A quick connect coupling according to claim 1, wherein the male assembly includes a first locking structure and the female assembly includes a second locking structure that is configured to intermate with the first locking structure to lock the male assembly to the female assembly when the two assemblies are rotated with respect to each other, wherein the first and second locking structures prevent axial separation between the two assemblies without first rotating the male assembly with respect to the female assembly.

8. A quick connect coupling according to claim 7, wherein one of the first and second locking structures includes at least one locking pin that is configured to slide into a slot defined by the other of the first and second locking structures to lock the male assembly to the female assembly.

9. A quick connect coupling according to claim 8, wherein the at least one locking pin is defined by the first locking structure.

10. A quick connect coupling according to claim 8, wherein the at least one locking pin is defined by the second locking structure.

* * * * *